US008747993B2

(12) United States Patent
Sato et al.

(10) Patent No.: US 8,747,993 B2
(45) Date of Patent: Jun. 10, 2014

(54) SLIDING COMPONENT AND TIMEPIECE

(75) Inventors: Miei Sato, Chiba (JP); Natsuki Miyoshi, Chiba (JP); Matsuo Kishi, Chiba (JP); Naoki Amano, Chiba (JP); Takashi Niwa, Chiba (JP)

(73) Assignee: Seiko Instruments Inc. (JP)

( * ) Notice: Subject to any disclaimer, the term of this patent is extended or adjusted under 35 U.S.C. 154(b) by 258 days.

(21) Appl. No.: 12/735,788

(22) PCT Filed: Feb. 18, 2009

(86) PCT No.: PCT/JP2009/052732
§ 371 (c)(1),
(2), (4) Date: Oct. 12, 2010

(87) PCT Pub. No.: WO2009/104624
PCT Pub. Date: Aug. 27, 2009

(65) Prior Publication Data

US 2011/0045249 A1 Feb. 24, 2011

(30) Foreign Application Priority Data

| | | |
|---|---|---|
| Feb. 21, 2008 | (JP) | 2008-039863 |
| Sep. 11, 2008 | (JP) | 2008-232941 |
| Jan. 9, 2009 | (JP) | 2009-003612 |

(51) Int. Cl.
*B32B 3/02* (2006.01)
*B32B 3/30* (2006.01)

(52) U.S. Cl.
USPC .......... 428/157; 428/172

(58) Field of Classification Search
USPC .......... 428/157, 172
See application file for complete search history.

(56) References Cited

U.S. PATENT DOCUMENTS

| | | | | |
|---|---|---|---|---|
| 2,664,695 | A * | 1/1954 | Huguenin | 368/124 |
| 3,826,076 | A * | 7/1974 | Tuetey | 368/129 |
| 3,999,445 | A * | 12/1976 | Liautaud | 74/445 |
| 6,755,566 | B2 * | 6/2004 | Damasko | 368/127 |
| 2005/0128884 | A1 * | 6/2005 | Endo et al. | 368/324 |
| 2006/0099438 | A1 * | 5/2006 | Arai et al. | 428/615 |

FOREIGN PATENT DOCUMENTS

JP 2005207454 A * 8/2005 .......... F16H 55/12

OTHER PUBLICATIONS

Patent Abstracts of Japan, publication No. 2006-064575, publication date Mar. 9, 2006.
Abstract, publication No. WO2005029203A1, publication date Mar. 31, 2005.

* cited by examiner

*Primary Examiner* — Maria Veronica Ewald
*Assistant Examiner* — Nathan Van Sell
(74) *Attorney, Agent, or Firm* — Adams & Wilks

(57) ABSTRACT

A sliding component has a multi-layer structure having a sliding portion configured to undergo sliding contact with a surface of another component different from the sliding component. A lubricating oil retaining/supplying structure retains a lubricating oil and supplies the lubricating oil to the sliding portion during sliding contact between the sliding portion and the surface of another component irrespective of a contact angle between the sliding portion and the surface of the another component.

16 Claims, 31 Drawing Sheets

(a)

(b)

(c)

(d)

(e)

(a)

(b)

(a)

(b)

(a)

(b)

(a)

(b)

(a)

(b)

(a)

(b)

(a)

(b)

(a)

(a)

(b)

SLIDING COMPONENT AND TIMEPIECE

CROSS-REFERENCE TO RELATED APPLICATIONS

This application is a U.S. national stage application of International Application No. PCT/JP2009/052732 filed Feb. 18, 2009, claiming an earliest priority date of Feb. 21, 2008, and published in a non-English language.

BACKGROUND OF THE INVENTION

1. Field of the Invention

The present invention relates to a sliding component used as a timepiece component such as a cogwheel or a bearing.

2. Background Information

As a method of manufacturing a sliding component of high dimensional precision such as a small cogwheel, there is employed a technique combining photolithography and electroforming (See, for example, Patent Document 1). A sliding component involves generation of friction due to a mutual action between itself and a component held in contact therewith. If the regions of these components in contact with each other lack wear resistance, these components will be worn early. The efficiency of a mechanism using the sliding component is markedly affected by wear. In view of this, in order to achieve an increase in wear resistance, a lubricating oil is used. However, being a liquid, the lubricating oil does not remain at the sliding portion but there is danger of its being dispersed over the entire sliding component or to other components. In view of this, some sliding components adopt a structure which retains the lubricating oil at the sliding portion (See, for example, Patent Document 2).

Patent Document 1: JP-A-2006-64575

Patent Document 2: JP-T-2007-506073

In the structure disclosed in Patent Document 1, the sliding portion is smooth, so that any lubricating oil used does not remain at the sliding portion but is quite likely to be dispersed.

The structure disclosed in Patent Document 2 adopts a lubricating oil retaining structure, so that the possibility of the lubricating oil being dispersed is low. FIG. 31 is a partial sectional view showing a sliding process between an escape tooth 501 of an escape wheel & pinion and a pallet 210 of a pallet fork constituting the mating component as disclosed in Patent Document 2.

The escape tooth 501 retains a lubricating oil 410 at a lubricating oil retaining portion 521, so that the lubricating oil 410 is not dispersed but remains at the sliding portion. As shown in FIGS. 31(*a*) and 31(*d*), when the escape tooth 501 and the pallet 210 are held in contact with each other in a straight state, the lubricating oil 410 is supplied to the sliding portion, so that lubrication property is to be expected.

Also in a case in which the escape tooth 501 and the pallet 210 are held in contact with each other while inclined as shown in FIGS. 31(*b*) and 31(*e*), the lubricating oil 410 is supplied to the sliding portion, so that lubrication property is to be expected. However, in a case in which the escape tooth 501 and the pallet 210 are held in contact with each other while inclined as shown in FIGS. 31(*c*) and 31(*f*), there is a possibility of the lubricating oil 410 not being supplied from the lubricating oil retaining portion 521.

SUMMARY OF THE INVENTION

It is an object of the present invention to provide a sliding component of high wear resistance having a lubricating oil retaining structure for supplying a lubricating oil independently of the angle between itself and the mating component. Another object is to provide a timepiece equipped with the sliding component.

According to the present invention, there is provided a sliding component in which at least three layers are stacked together and which has a sliding portion sliding on another component on an outer peripheral surface substantially parallel to the direction in which the layers are stacked, characterized in that there is formed a recess in a sliding portion of at least one internally situated layer between an uppermost layer and a lowermost layer of the at least three layers stacked together. According to this invention, the recess constituting a lubricating oil retaining portion is not situated on one side of the stacking direction, so that it is possible to reliably supply the lubricating oil without being much affected by the contact angle between the sliding component and the mating component, making it possible to obtain a sliding component of high wear resistance.

In the sliding component of the present invention, the recess may be formed by causing at least one internally situated layer between the uppermost and the lowermost layers of the at least three layers stacked together to recede.

The sliding component of the present invention is characterized in that there are provided a plurality of recesses as mentioned above in the stacking direction. According to this invention, the sliding component is less subject to the influence of the contact angle between itself and the mating component, making it possible to supply the lubricating oil more reliably.

The sliding component of the present invention is characterized in that the recess is formed over the entire periphery of the outer peripheral surface. According to this invention, it is possible to augment the amount of lubricating oil retained in the recess.

The sliding component of the present invention may be of a structure in which at least three layers formed of at least two different kinds of materials are stacked together. In this connection, the material of one layer of the layers may be of higher heat conductivity than the material of the other layers.

The sliding component of the present invention is characterized in that at least one of protrusion layers protruding with respect to the layer forming the recess has a curved surface at a crossing portion between a surface substantially perpendicular to the stacking direction and a surface substantially parallel thereto.

The sliding component of the present invention is characterized in that the at least three layers comprise a predetermined layer, and a first opposing layer and a second opposing layer which are opposed to the predetermined layer in the thickness direction of the predetermined layer, that the recess is formed by causing the predetermined layer to recede from the outer peripheral surface of the first opposing layer or the second opposing layer, and that at least one of the first opposing layer and the second opposing layer has a curved surface at a crossing portion between a surface substantially perpendicular to the stacking direction and a surface substantially parallel thereto.

The sliding component of the present invention is characterized in that at least one of the first opposing layer and the second opposing layer has the curved surface on the former of a predetermined layer side where the predetermined layer is formed and aside opposite to the predetermined layer side.

The sliding component of the present invention is characterized in that at least one of the first opposing layer and the second opposing layer has the curved surface on the latter of a predetermined layer side where the predetermined layer is formed and a side opposite to the predetermined layer side.

The sliding component of the present invention is characterized in that at least one of the first opposing layer and the second opposing layer has the curved surface on both of a predetermined layer side where the predetermined layer is formed and a side opposite to the predetermined layer side.

The sliding component of the present invention is characterized in that it is used as a timepiece component.

A timepiece according to the present invention is characterized in that it is equipped with a sliding component according to the present invention.

According to the present invention, there is provided a sliding component manufacturing method comprising the steps of: forming a photosensitive material layer on an upper surface of a conductive substrate; exposing the photosensitive material via a mask pattern arranged above the photosensitive material; developing the photosensitive material to form a cavity consisting of the photosensitive material and an exposed surface of the conductive substrate; depositing at least two or more kinds of material layers on the exposed surface of the conductive substrate in the cavity by electroforming; extracting the deposited Material layers from the cavity; and selectively removing a part of the surfaces of the material layers.

According to the present invention, it is possible to provide a sliding component of superior wear resistance having a lubricating oil retaining structure, and a timepiece employing this sliding component as a timepiece component to thereby achieve an increase in maintenance period. Further, according to the manufacturing method of the present invention, it is possible to easily manufacture a sliding component of superior wear resistance having a lubricating oil retaining structure.

DETAILED DESCRIPTION OF THE PREFERRED EMBODIMENTS

First Embodiment

In the following, a first embodiment of the present invention will be described with reference to the drawings.

Figure 1:
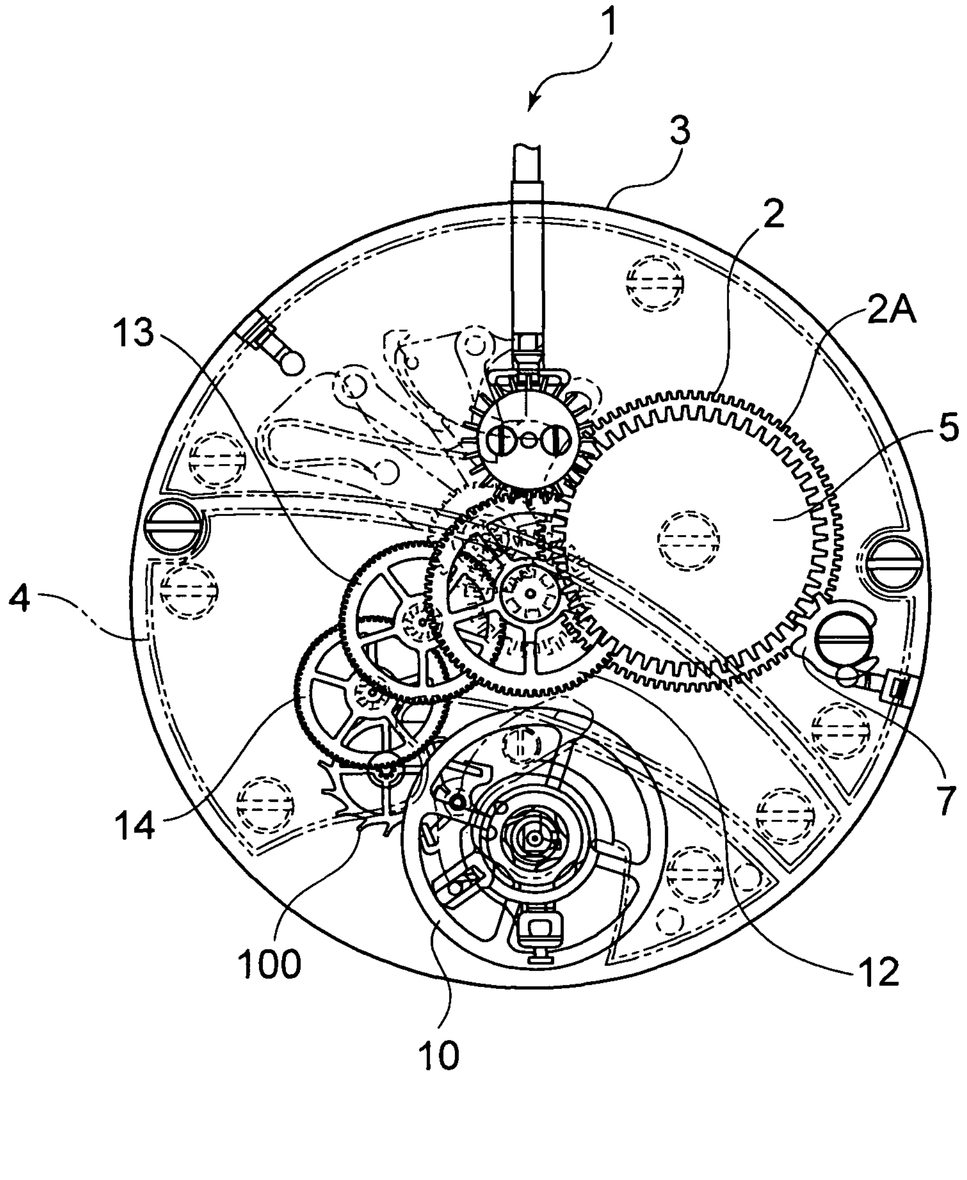
FIG. 1 A plan view schematically showing the configuration of a front train wheel side of a movement.
Figure 2:
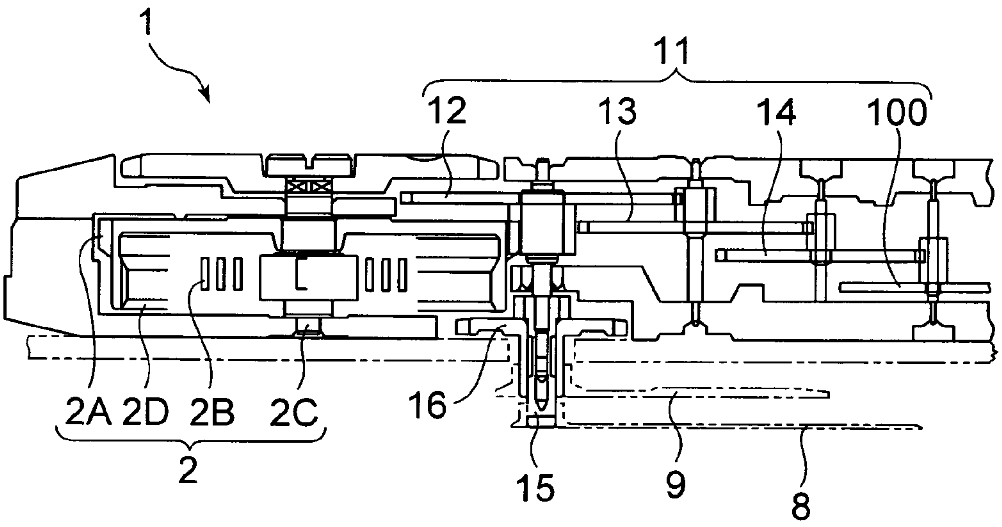
FIG. 2 A schematic partial sectional view showing a portion extending from a barrel drum to a pallet fork.
Figure 3:
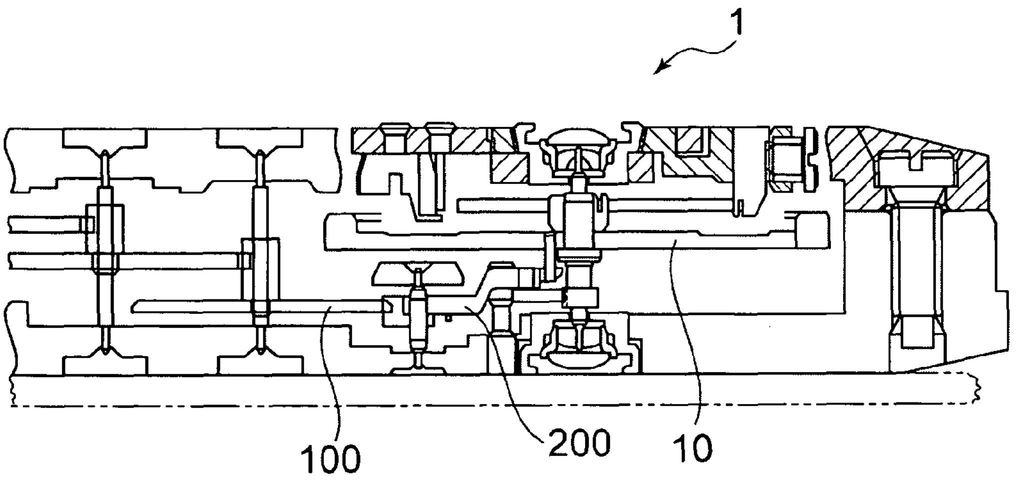
FIG. 3 A schematic partial sectional view showing a portion extending from an escape wheel & pinion to a balance with hairspring.

FIG. 1 is a plan view schematically showing the configuration of a movement front train wheel side of a movement of a timepiece 1, FIG. 2 is a schematic partial sectional view showing a portion extending from a barrel drum 2 to an escape wheel & pinion 100 of the timepiece 1, and FIG. 3 is a schematic partial sectional view showing a portion from the escape wheel & pinion 100 to a balance with hairspring 10 of the timepiece.

Here, the timepiece 1 is a two-hand type mechanical timepiece. However, the timepiece may also be an electronic control type mechanical timepiece, a quartz type timepiece, etc.

The timepiece 1 is equipped with a movement barrel 2 equipped with a mainspring 2B, a barrel cogwheel 2A, a barrel arbor 2C, and a barrel cover 2D. An external end of the mainspring 2B is fixed to the barrel cogwheel 2A, and an internal end thereof is fixed to the barrel arbor 2C. The barrel arbor 2C is supported by a main plate 3 and a train wheel bridge 4, and is fixed in position by a ratchet wheel screw so as to rotate integrally with a ratchet wheel 5. The ratchet 5 is in mesh with a click 7 so as to rotate clockwise but not to rotate counterclockwise. The method of winding the mainspring 2B is the same as the self-winding and the manual winding of an ordinary mechanical timepiece, so that a description thereof will be omitted.

The rotation of the barrel cogwheel 2A is increased in speed via a speed increasing train wheel 11 composed of a center wheel & pinion 12, a third wheel & pinion 13, and a second wheel & pinion 14, and is then transmitted to the balance with hairspring 10 via an escape wheel & pinion 100 and a pallet fork 200.

A cannon pinion 15 is fixed to the second wheel & pinion 12 of the speed increasing train wheel 11, and a minute hand 8 is fixed to the cannon pinion 15. Based on the rotation of the cannon pinion 15, an hour wheel 16 is rotated via the rotation of a minute wheel (not shown). An hour hand 9 is fixed to the hour wheel 16. That is, the indicator hands 8, 9 are connected to the speed increasing train wheel 11, and the barrel cogwheel 2A and the cogwheels of the wheels & pinions 12 through 14 used in the speed increasing train wheel 11 are used as cogwheels driving the indicator hands 8, 9 of the timepiece 1. Thus, high dimensional precision and wear resistance are required of each timepiece component.

The timepiece 1 has various train wheels; in the following description, for the sake of simplicity, the escape wheel & pinion 100 will be taken as an example. It should be noted, however, that the escape wheel & pinion is only taken as an example to facilitate the understanding of the present invention.

Figure 4:
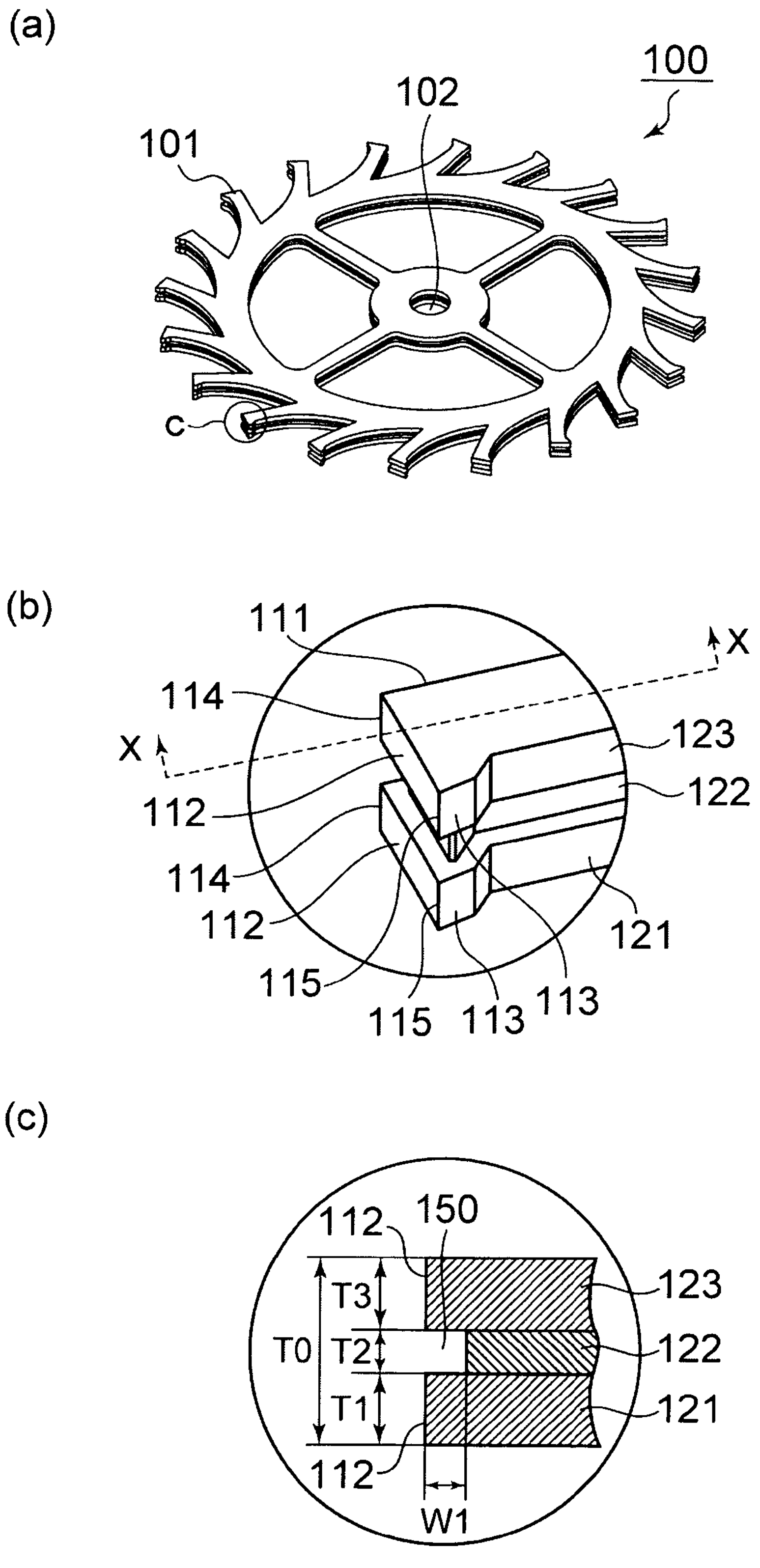
FIG. 4 A diagram showing an escape wheel & pinion having a structure according to the present invention.

FIG. 4(*a*) shows the escape wheel & pinion (sliding component) 100 having a structure according to the present invention. The escape wheel & pinion 100 has a plurality of escape teeth 101 in the outer periphery thereof, and an axial hole 102 extending in the thickness direction at the center thereof. The escape wheel & pinion 100 is a component used as a timepiece component of the mechanical timepiece shown in FIGS. 1 through 3.

FIG. 4(*b*) is an enlarged view of the portion of an escape tooth 101 enclosed by a circle C in FIG. 4(*a*). The escape tooth 101 has a stop surface 111, an impact surface 112, and a back surface 113, and a crossing ridge between the stop surface 111 and the impact surface 112 constitutes a rocking corner 114, and a crossing ridge between the impact surface 112 and the back surface 113 constitutes a let-off corner 115. The stop surface 111, the impact surface 112, and the back surface 113 constitute a part of an outer peripheral surface substantially parallel to the thickness direction of the escape wheel & pinion 100, and the impact surface 112 including the rocking corner 114 and the let-off corner 115 constitute a sliding portion sliding on a pallet 210 described below. The escape wheel & pinion 100 of the structure of the present invention has a multi-layer structure in which at least three layers are stacked together in the thickness direction; for example, in this embodiment, it is composed of a first metal layer 121 (first opposing layer) and a third metal layer 123 (second opposing layer) which are formed of the same material, and a second metal layer 122 which is between the first and second metal layers 121, 123 and which is formed of a material different therefrom.

Examples of the material of the first and third metal layers 121, 123 include metals such as nickel (Ni), cobalt (Co), platinum (Pt), rhodium (Rh), chromium (Cr), and palladium (Pd), alloys such as Ni-tungsten (W) and Ni-boron (B), and composites obtained as eutectoid, in the matrix of one of the above-mentioned metals, of particles or fibers of ceramics such as alumina ($Al_2O_3$) or silicon carbide (SiC), or a resin such as polytetrafluoroethylene (PTFE), or some other organic or inorganic substance. Examples of the material of the second metal layer 122 include metals such as copper (Cu), gold (Au), zinc (Zn), silver (Ag), iron (Fe), and tin (Sn), alloys such as Cu—Au and Cu—Ag, or a composite obtained as eutectoid of the particles or fibers as mentioned above in the matrix of one of the above metals. In the manufacturing process described below, in order to form a recess 150 in the second metal layer 122 through etching, there is adopted a combination of materials allowing selective etching of the second metal layer 122 only, or a combination of materials involving a difference in etching rate. Since the escape wheel & pinion 100 is a sliding component, it is desirable for the first and third metal layers 121, 123 which come into contact with the mating component to be formed of a hard material.

FIG. 4(*c*) is a sectional view of the escape wheel & pinion 100 taken along the line X-X of FIG. 4(*b*). In the escape wheel & pinion 100 having the structure of the present invention, the outer dimension of the second metal layer 122 is smaller than the outer dimension of the first and third metal layers 121, 123. The outer peripheral surface of the second metal layer 122 is receded from the outer peripheral surface of the escape wheel & pinion 100 (the outer peripheral surfaces of the first and third metal layers 121, 123). Thus, in this embodiment, the escape wheel & pinion 100 has, at least in a part of the sliding portion, a recess 150 extending over the entire periphery of the outer peripheral surface of the escape wheel & pinion 100 and not open in the thickness direction. The recess 150 serves to retain a lubricating oil.

In this embodiment, the thickness T0 of the escape wheel & pinion 100 is 100 μm. The thickness T0 is set to 10 μm to 1 mm according to the component to be manufactured. The thickness T1 of the first metal layer 121 and the thickness T3 of the third metal layer 123 range from 1 μm to 900 μm. It is not necessary for the thickness T1 and the thickness T3 to be of the same value. The thickness T2 of the second metal layer 122 is set to 500 nm to 500 μm. The depth W1 of the recess 150 is set to 1 μm to 1 mm. The thickness T2 and the depth W1 determining the size of the recess 150 are determined as appropriate according to the viscosity and surface tension of the lubricating oil.

Figure 5:
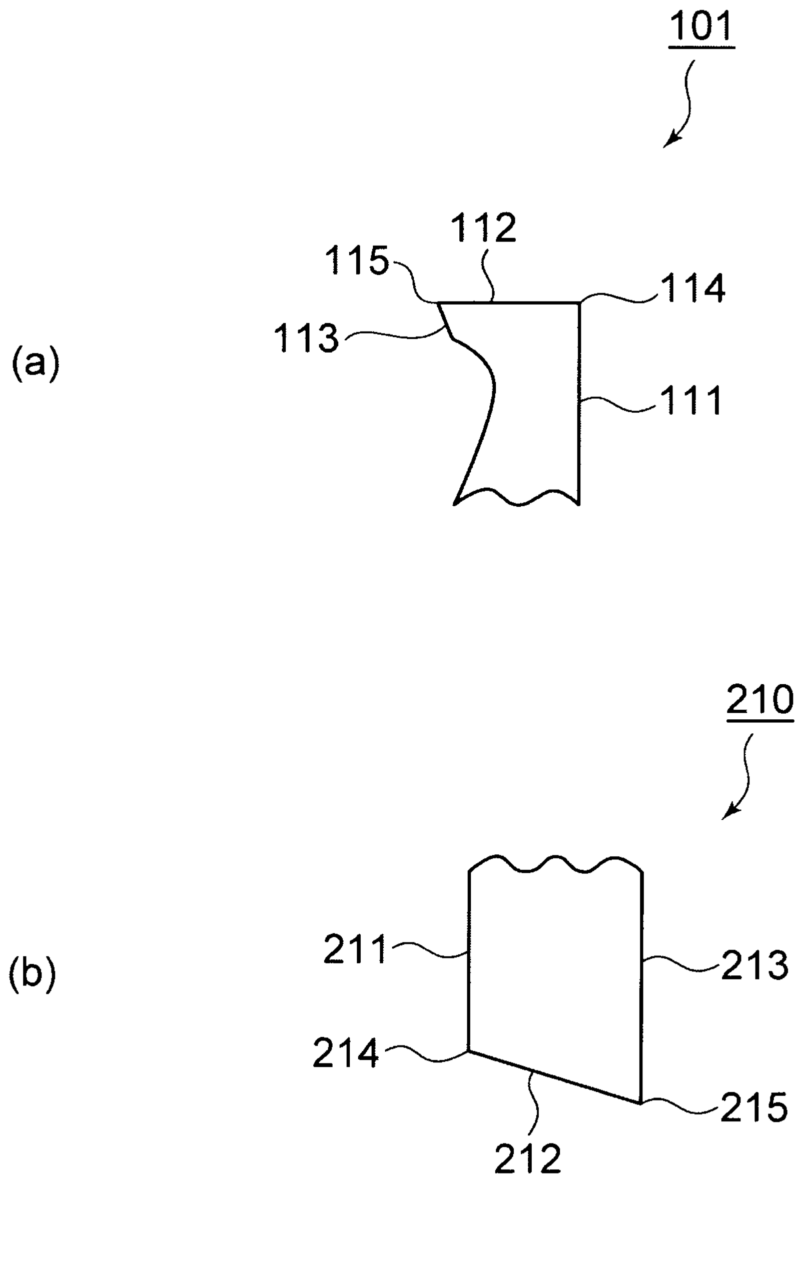
FIG. 5 An enlarged partial view of an escape tooth and a pallet.

The escape wheel & pinion 100 slides on a pallet fork 200. More specifically, escape teeth 101 of the escape wheel & pinion 100 slide on pallets 210 of the pallet fork 200. FIG. 5(*a*) is a partial enlarged view of an escape tooth 101, and FIG. 5(*b*) is a partial enlarged view of a pallet 210 of the pallet fork 200. Like the escape tooth 101, the pallet 210 is composed of a stop surface 211, an impact surface 212, a back surface 213, a rocking corner 214, and a let-off corner 215.

Figure 6:
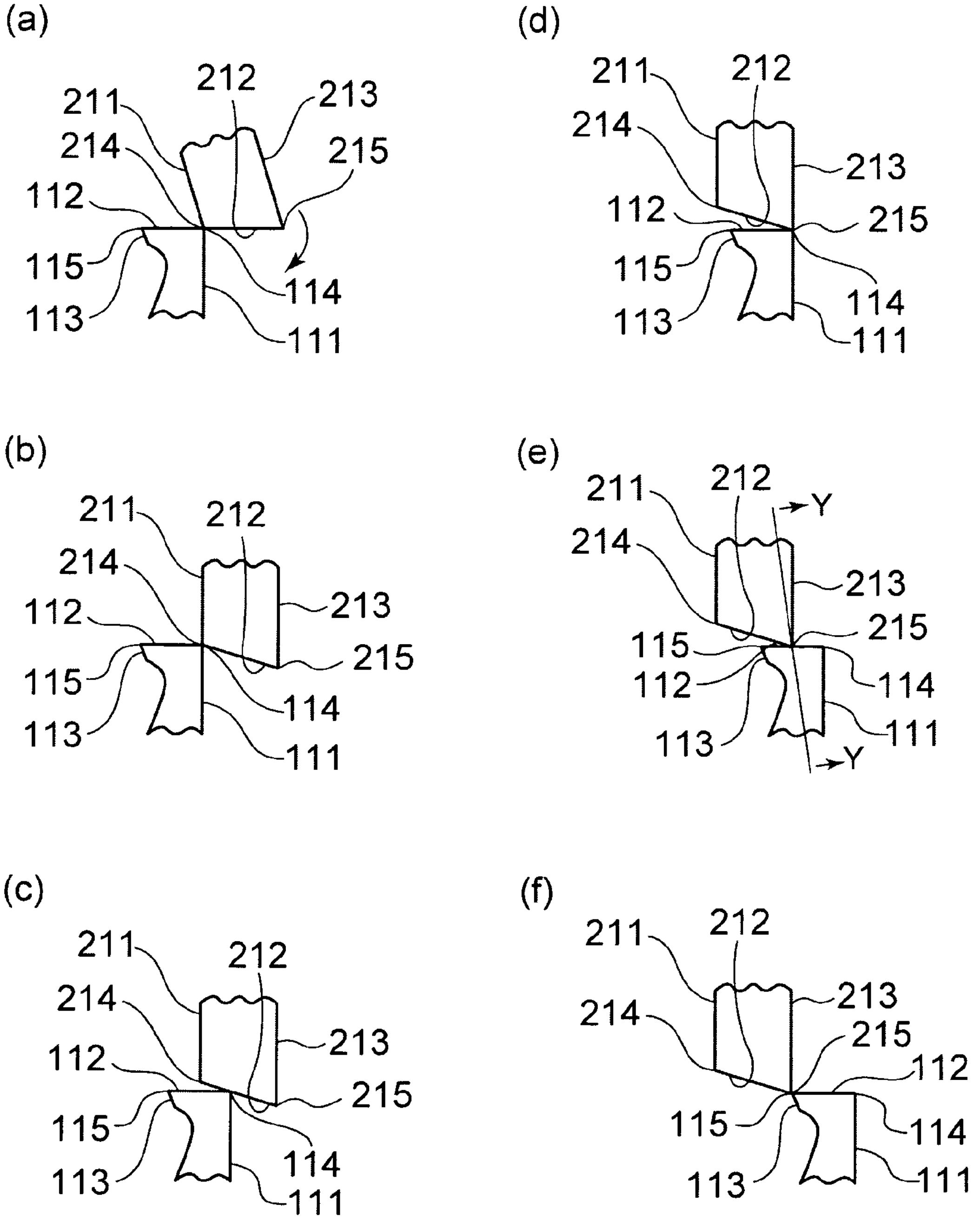
FIG. 6 A diagram showing a sliding process of an escape tooth and a pallet.

The process in which the escape tooth 101 slides on the pallet 210 will be described with reference to FIG. 6. In FIG. 6(*a*), the rocking corner 114 of the escape tooth 101 is in contact with the stop surface 211 of the pallet 210, with the pallet fork stopping the escape wheel & pinion 101.

When the pallet fork moves in the direction of the arrow, a state is attained in which the rocking corner 114 of the escape tooth 101 and the rocking corner 214 of the pallet 210 are held in contact with each other as shown in FIG. 6(*b*), and then the rocking corner 114 of the escape tooth 101 slides on the impact surface 212 of the pallet 210 as shown in FIG. 6(*c*).

A state is attained in which the rocking corner 114 of the escape tooth 101 and the let-off corner 215 of the pallet 210 are held in contact with each other as shown in FIG. 6(*d*); and then, as shown in FIG. 6(*e*), the let-off corner 215 of the pallet 210 slides on the impact surface 112 of the escape tooth 101.

When the let-off corner 115 of the escape tooth 101 and the let-off corner 215 of the pallet 210 are brought into contact with each other as shown in FIG. 6(*f*), the escape tooth 101 and the pallet 210 are separated from each other.

Figure 7:
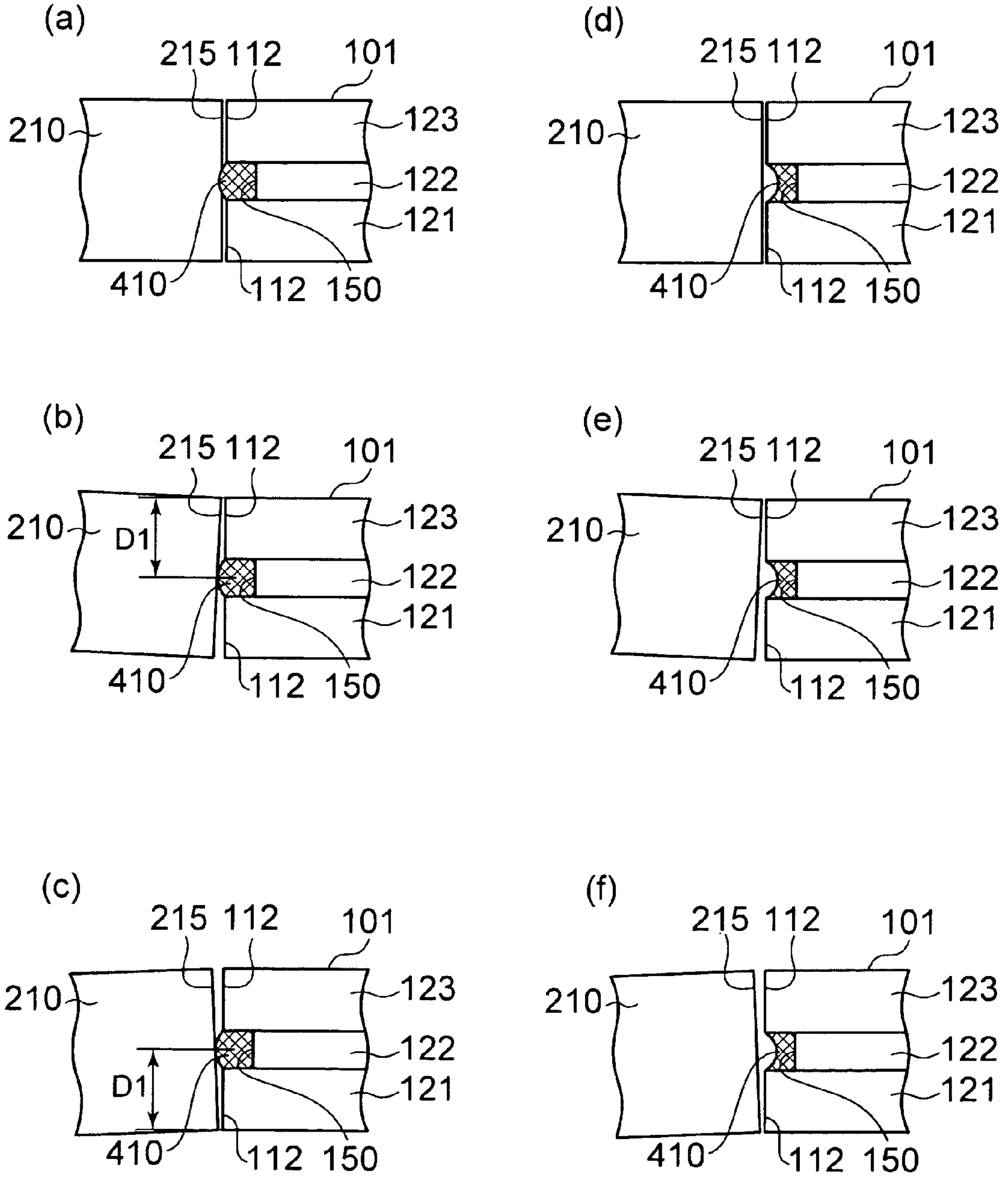
FIG. 7 A diagram showing a lubricating oil supply function of an escape wheel & pinion having a structure according to the present invention.

In the sliding process shown in FIG. 6, friction occurs between the escape tooth 101 and the pallet 210, so that a lubricating oil is applied in order to achieve an improvement in terms of wear resistance. FIG. 7 is a sectional view taken along the line Y-Y of FIG. 6(*e*). As shown in FIGS. 7(*a*) and 7(*d*), the recess 150 serves to retain a lubricating oil 410.

The recess 150 is provided over the entire periphery of the escape wheel & pinion 100, so that, in all of the states of the sliding process illustrated with reference to FIG. 3, it is possible to supply the lubricating oil 410 to the sliding portion. Further, in the escape wheel & pinion 100, the recess 150 constituting the lubricating oil retaining portion thereof is not situated on one side in the stacking direction but substantially at the center, so that even when the pallet 210 is inclined as shown in FIGS. 7(*b*), 7(*e*), 7(*c*), and 7(*f*), it is possible to supply the lubricating oil 410 to the sliding portion.

In the escape wheel & pinion 100, the lubricating oil 410 is supplied from the recess 150 to the sliding portion more reliably, whereby an improvement in terms of sliding property is achieved. As a result, the escape wheel & pinion 100 is improved in terms of wear resistance, and the service life of the components becomes longer than that in the prior art.

Further, the recess 150 is provided in the entire periphery of the escape wheel & pinion 100, so that the oil retaining amount is larger than that of an escape wheel & pinion of a conventional structure. A mechanical timepiece requires maintenance for oiling the sliding components every several years; by using a sliding component of the structure of the present invention, it is possible to elongate the inter-maintenance period as compared with the prior art.

In the following, a method of manufacturing an escape wheel & pinion 100 of the structure of the present invention will be described with reference to FIGS. 8 through 11. FIGS. 8 through 11 are partial sectional views illustrating a manufacturing process for the escape wheel & pinion 100. Here, the portion around which one escape wheel & pinion 100 is formed is schematically shown in section.

Figure 8:
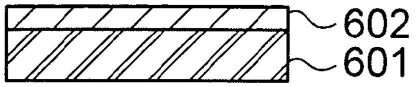
FIG. 8 A diagram showing a manufacturing process for an escape wheel & pinion having a structure according to the present invention.
Figure 8:
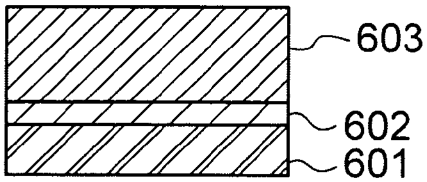
Figure 8:
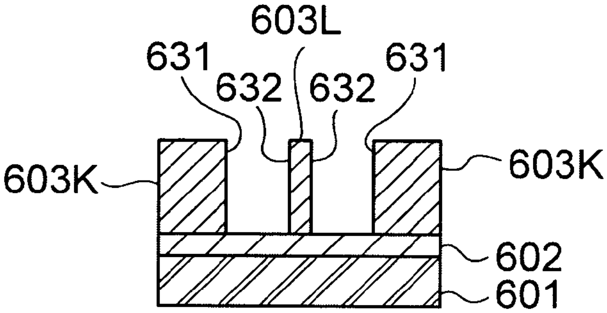
Figure 8:
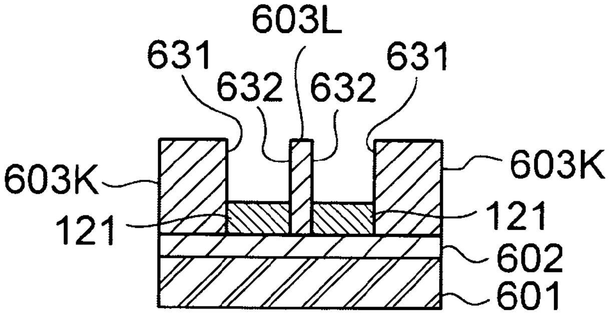
Figure 8:
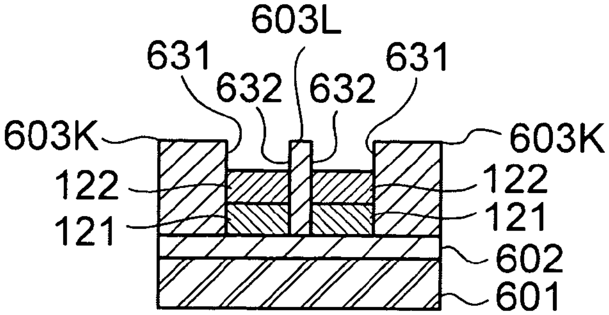

FIG. 8(*a*) is a diagram illustrating a process for forming a conductive substrate. An electrode material 602 is formed on a substrate 601. The substrate 601 is formed of silicon, quartz, sapphire or the like. The electrode material 602 consists of Cu, Au, Cr, Ti or the like. It is also possible to form the substrate 601 of a metal such as stainless steel or Ti. In the case in which the substrate 601 is formed of a metal, there is no need to form the electrode material 602. The thickness of the substrate 601 is set to 100 μm to 1 mm so that it can support itself in the processes described below. The thickness of the electrode material 602 is set to 10 nm to 10 μm.

FIG. 8(*b*) is a diagram illustrating a resist forming process. A photo resist 603 is deposited on the electrode material 602. The photo resist 603 may be of either the negative type or the positive type. The photo resist 603 is formed by spin coating, dip coating or the like. When using a dry film resist as the photo resist 603, it is formed on the electrode material 602 by a laminating method. The thickness of the photo resist 603 is not less than the thickness T0 of the escape wheel & pinion 100. In the following, the case will be described in which the photo resist 603 is of the negative type.

FIG. 8(*c*) is a diagram illustrating a developing process. Using a photo mask with a contour pattern of the escape wheel & pinion 100, the photo resist 603 is irradiated with ultraviolet rays, thereby curing the portion of the resist other than that used for electroforming of the escape wheel & pinion 100. The uncured resist portion is removed, whereby the electroforming mold is completed. A side surface 631 of a photo resist 603K has a configuration corresponding to the contour of the escape wheel & pinion 100. A side surface 632 of a photo resist 603L has a configuration corresponding to that of the axial hole 102.

FIGS. 8(*d*) through 9(*a*) are diagrams illustrating an electroforming process. The first metal layer 121, the second metal layer 122, and the third metal layer 123 are stacked together in that order such that the second metal layer 122 is between the first and third metal layers 121, 123. The electroformed product grows solely from the bottom surface.

FIG. 8(*d*) is a diagram illustrating a metal layer electroforming process. The first metal layer 121 is deposited on the mold portion on the electrode material 602 other than the photo resists 603K, 603L to a thickness of T1.

FIG. 8(*e*) is a diagram illustrating a metal electroforming process. The second metal layer 122 is deposited on the second metal layer 122 to a thickness of T2. The sum total of the thickness T1 and the thickness T2 is smaller than the thickness T0.

Figure 9:
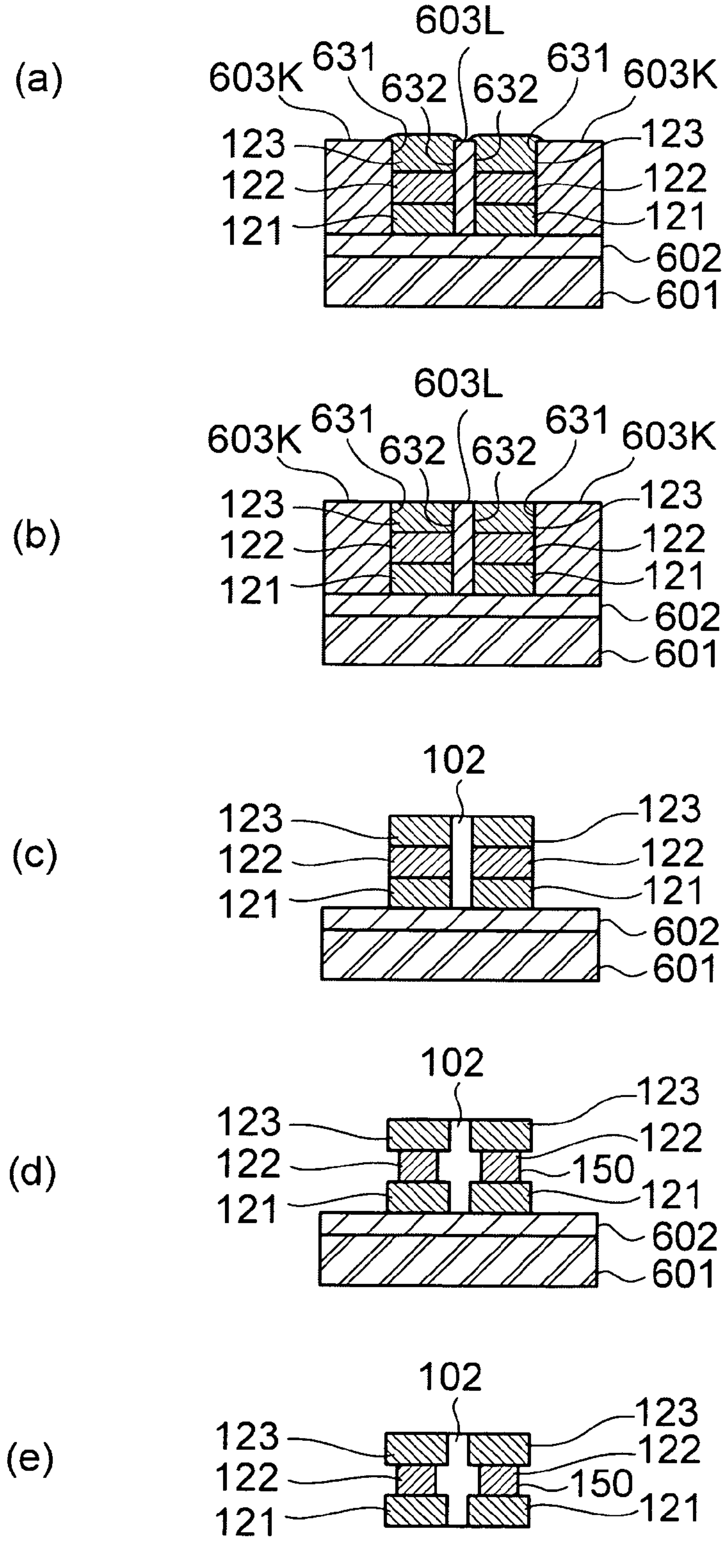
FIG. 9 A diagram showing a manufacturing process for an escape wheel & pinion having a structure according to the present invention.

FIG. 9(*a*) is a diagram illustrating a metal electroforming process. The third metal layer 123 is deposited on the second metal layer 122 to a thickness of not less than T3 so that the thickness of the electroformed product may be not less than the thickness T0 of the escape wheel & pinion. However, in the case in which the grinding/polishing process shown in FIG. 9(*b*) to be performed thereafter is omitted, the third metal layer 123 is deposited to a thickness T3 so that the thickness of the electroformed product may become T0.

FIG. 9(*b*) is a diagram illustrating the grinding/polishing process. Through grinding, the third metal layer 123 and the photo resists 603K, 603L are cut such that the thickness of the escape wheel & pinion 100 becomes T0, thereby effecting flattening. Polishing is further performed to form the surface of the third metal layer 123 as a mirror surface.

FIG. 9(*c*) is a diagram illustrating a resist removal process. The photo resists 603K, 603L are removed by etching, physical force or the like.

FIG. 9(*d*) is a diagram illustrating a recess forming process. An electroformed product is immersed in an etching liquid which effects etching on the second metal layer 122 but which does not effect etching on the first and third metal layers 121, 123. Etching is effected only on the second metal layer 122 to form the recess 150 having a depth W1. For example, in the case in which Ni is deposited on the first and third metal layers 121, 123 and in which Cu is deposited on the second metal layer 122, it is possible to effect etching solely on the Cu by using an ammonium persulfate solution as the etching liquid.

FIG. 9(*e*) is a diagram illustrating an electroformed product separating process. The substrate 601 and the electrode 602 are removed by etching, physical force or the like.

The processes shown in FIGS. 9(*c*) through 9(*e*) after the grinding/polishing may also be performed by the following steps.

Figure 10:
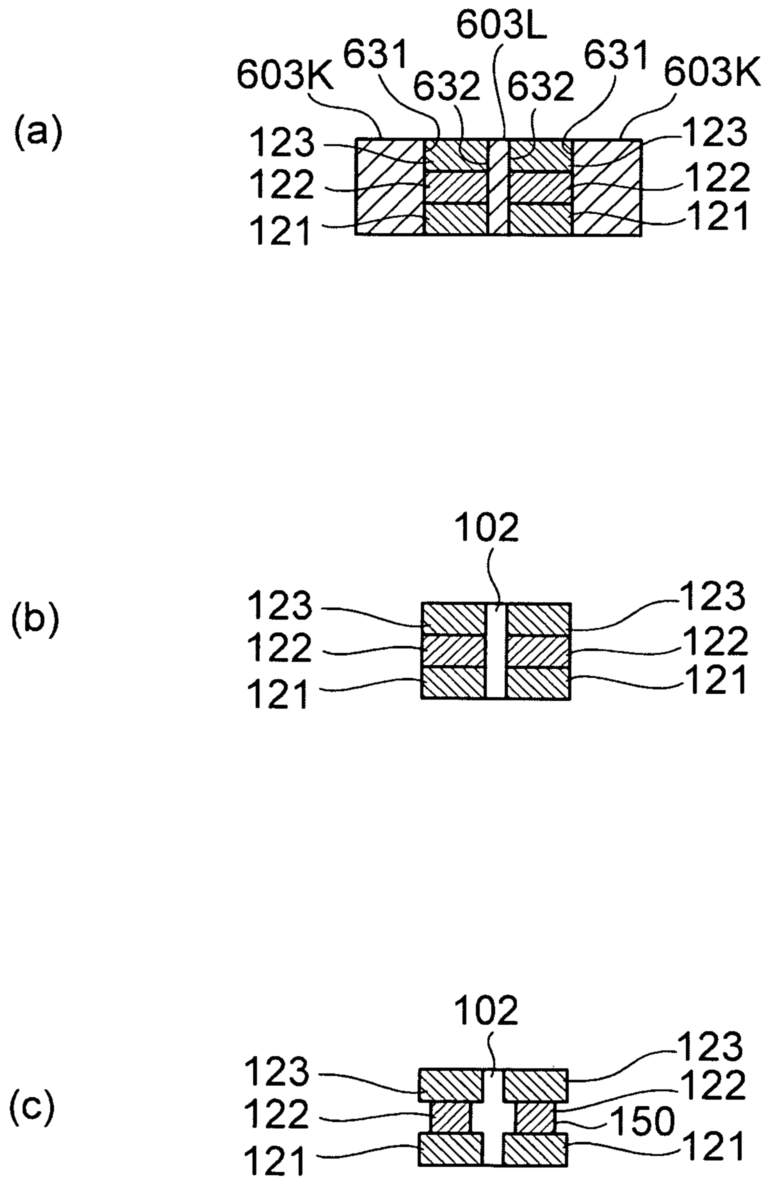
FIG. 10 A diagram showing a manufacturing process for an escape wheel & pinion having a structure according to the present invention.

FIG. 10(*a*) is a diagram illustrating a substrate/electrode removal process. The substrate 601 and the electrode 602 are removed by etching or the like.

FIG. 10(*b*) is a diagram illustrating a resist removal process. The photo resists 603K, 603L are removed by etching, physical force or the like.

FIG. 10(*c*) is a diagram illustrating a recess forming process. An electroformed product is immersed in an etching liquid which effects etching on the second metal layer 122 but which does not effect etching on the first and third metal layers 121, 123. Etching is effected only on the second metal layer 122 to form the recess 150 of the depth W1.

Figure 11:
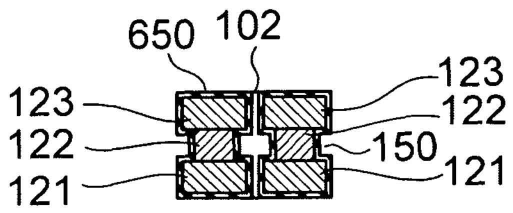
FIG. 11 A diagram showing a manufacturing process for an escape wheel & pinion having a structure according to the present invention.
Figure 11:
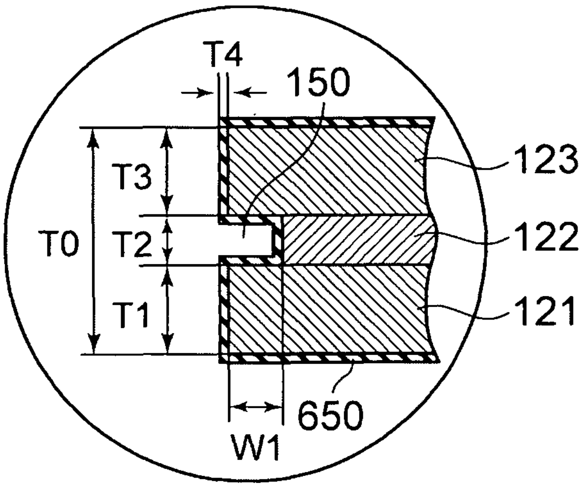

When an improvement in functions such as corrosion resistance, lubrication property, and heat resistance is to be achieved, and when the oil retaining property is to be improved by increasing wettability, there is added a plating process shown in FIGS. 11(*a*) and 11(*b*) after the process shown in FIG. 9(*e*) or FIG. 10(*c*). A metal film 650 is formed by plating all over the separated electroformed product. Examples of the material of the metal film 650 include metals such as Ni, Co, Rh, and Cr, alloys such as Ni—W and Ni—Co, and composites such as Ni—$Al_2O_3$ and Ni-PTFE. The thickness T4 of the metal film 650 is set to 100 nm to 100 μm. The thickness, however, is to be such as will not cause the recess 150 to be filled up.

As described above, according to the manufacturing method of the present invention, it is possible to easily manufacture the sliding component shown in FIG. 4.

Figure 12:
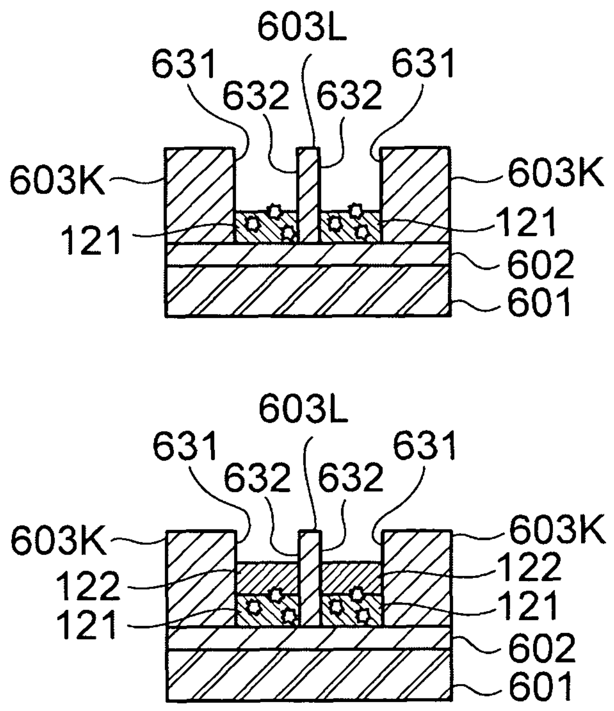
FIG. 12 A diagram showing a manufacturing process for an escape wheel & pinion having a structure according to the present invention.

FIG. 12 is a diagram illustrating an electroforming process performed in the case in which there is used, as the material of the first metal layer 121, a composite obtained through eutectoid reaction of particles of $Al_2O_3$, SiC or the like in the metal matrix of Ni, Co or the like. FIG. 12(*a*) is a diagram illustrating an electroforming process for the first metal layer 121. As shown in FIG. 12(*a*), a part of the eutectoid composite particles is not completely confined in the metal matrix but is exposed on the upper surface. The exposed composite particles are completely confined in the metal layer 122 in the electroforming process for the second metal layer 122 shown in FIG. 12(*b*). In the case in which the composite particles of the first metal layer 121 consist of a substance of rough surface, eutectoid reaction of the composite particles occurs in the interface of the metal layers 121, 122, thereby increasing the force with which the two metal layers are held in intimate contact with each other. This effect is the same with the intimate contact force between the second metal layer 122 and the third metal layer 123 in the casein which a composite is used as the material of the second metal layer 122. A similar effect is also obtained in the case in which the substance that undergoes eutectoid reaction consists of fibers of tungsten carbide (WC) or the like.

Figure 13:
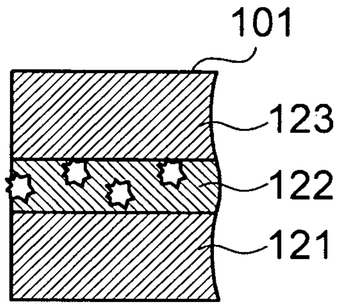
FIG. 13 A diagram showing a manufacturing process for an escape wheel & pinion having a structure according to the present invention.
Figure 13:
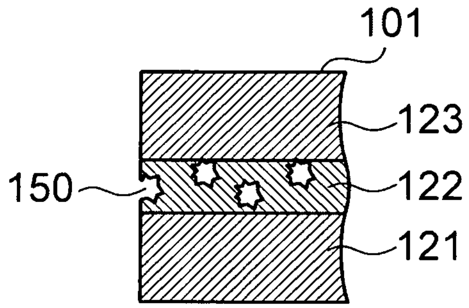

In the case in which there is used, as the material of the second metal layer 122, a composite obtained through eutectoid reaction of particles of PTFE, acrylic resin or the like in the metal matrix of Ni, Cu or the like, the recess can also be formed by the process shown in FIG. 13. FIG. 13(*a*) shows the state after the resist removal process in the case in which there is used, as the material of the second metal layer 122, a composite obtained through eutectoid reaction of particles of PTFE, acrylic resin or the like in the metal matrix of Ni, Cu or the like. As shown in FIG. 13(*a*), a part of the composite particles appears through eutectoid reaction in the sliding surface. By removing the composite particles thus appearing through eutectoid reaction in the sliding surface by heat treatment, organic solvent or the like, it is possible to form the recess 150 shown in FIG. 13(*b*). In this case, the recess 150 is not formed over the entire periphery of the outer peripheral surface but is solely formed in the portion where the composite particles appearing through eutectoid reaction are removed. The recess 150 serves to retain the lubricating oil.

In some cases, the escape wheel & pinion 100 involves generation of friction heat during sliding, and the temperature of the sliding portion increases to reduce the hardness of the material forming the escape wheel & pinion 100, making it subject to wear. However, in the present invention, by using a material of high heat conductivity for the second metal layer 122, it is possible to improve the heat conductivity of the entire escape wheel 6 pinion 100, and it becomes hard for the temperature of the first and third metal layers 121, 123 to rise, so that the layers become resistant to wear. In an example of such combination of metals, Ni is used for the first and third metal layers 121, 123, and Cu is used for the second metal layer 122.

Figure 14:
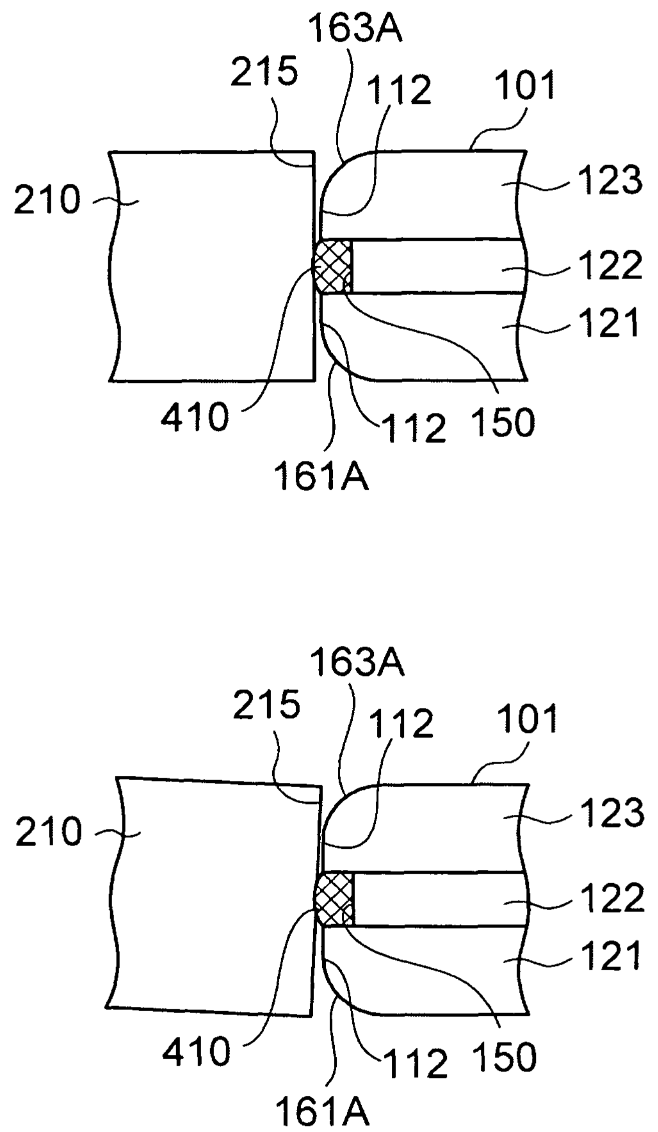
FIG. 14 A diagram showing a lubricating oil supply function of an escape wheel & pinion having a structure according to the present invention.

Further, by adopting the configuration shown in FIG. 14, it is possible to achieve a further improvement in terms of wear resistance. The escape wheel & pinion 100 shown in FIG. 14 has curved surfaces 161A, 163A at crossing portions between the outer peripheral surfaces of the first and third metal layers 121, 123 and the surfaces not in contact with the second metal layer 122. It is not necessary for the curvature R11*a* of the curved surface 161A and the curvature R13*a* of the curved surface 163A to be of the same value. As shown in FIGS. 7(*b*), 7(*e*), 7(*c*), and 7(*f*), in the case in which the escape tooth 101 and the pallet 210 are in contact with each other while inclined, there is a possibility of a corner abutting to cause an increase in frictional force. On the other hand, when the configuration as shown in FIG. 14 is adopted, as shown in FIG. 14(*b*), through formation of the curved surfaces 161A, 163A, even when the escape tooth 101 and the pallet 210 are held in contact with each other while inclined, no corner abuts, and satisfactory lubrication property is attained, so that the frictional force is reduced, and an improvement in terms of wear resistance is achieved. Further, due to the formation of the curved surfaces 161A, 163A, the Hertz contact pressure at the time of sliding is reduced, so that an improvement in terms of wear resistance is achieved.

A method of manufacturing the escape wheel & pinion 100 having the structure shown in FIG. 14 will be described below with reference to FIGS. 15 and 16.

Figure 15:
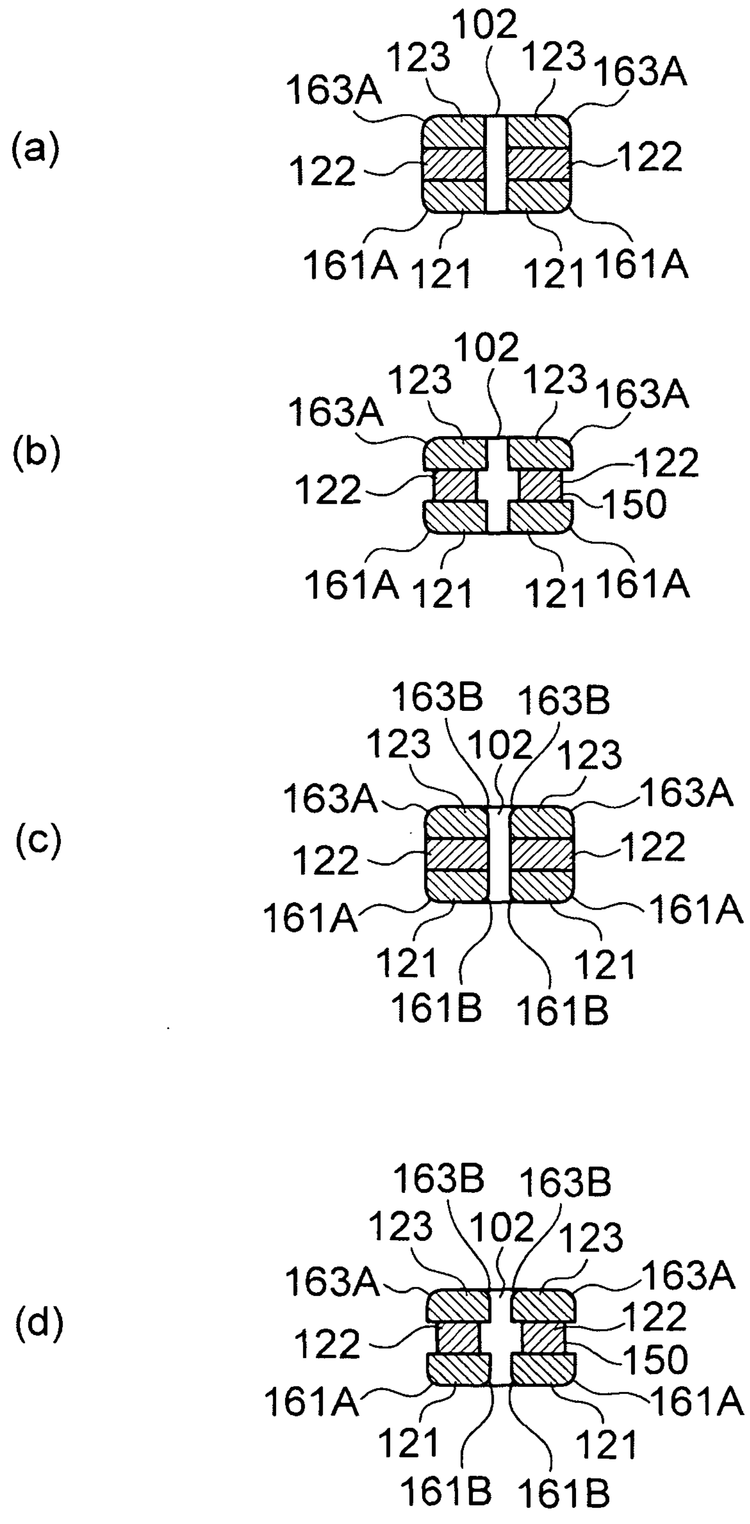
FIG. 15 A diagram showing a manufacturing process for an escape wheel & pinion having a structure according to the present invention.

FIGS. 15(*a*) and 15(*c*) are diagrams illustrating a barrel polishing process. After the process of FIG. 10(*b*), the electroformed product is polished with a barrel to form the curved surfaces 161A, 163A. The radius of the curved surfaces 161A, 163A can be adjusted according to the barrel polishing condition. As shown in FIG. 15(*c*), according to the barrel polishing condition, also the crossing portions between the inner peripheral surfaces of the first and third metal layers 121, 123 and the surfaces not in contact with the second metal layer 122 are also polished, thereby forming curved surfaces 161B, 163B. It is not necessary for the curvatures R11*a*, R13*a*, the curvature R11*b* of the curved surface 161B, and the curvature R13*b* of the curved surface 163B to be of the same value.

FIGS. 15(*b*) and 15(*d*) are diagrams illustrating a recess forming process. An electroformed product is immersed in an etching liquid which effects etching on the second metal layer 122 but does not effect etching on the first and third metal layers 121, 123. Etching is effected only on the second metal layer 122 to form the recess 150 of the depth W1.

The process illustrated in FIGS. 15(*c*) and 15(*d*) can also be performed by the following process.

Figure 16:
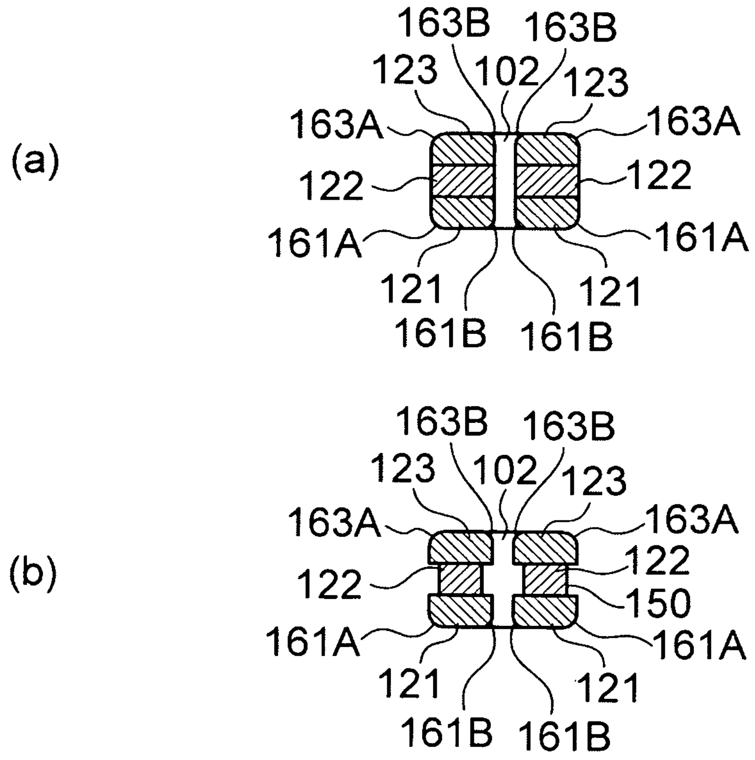
FIG. 16 A diagram showing a manufacturing process for an escape wheel & pinion having a structure according to the present invention.

FIG. 16(*a*) is a diagram illustrating a wet etching process. An electroformed product is immersed in an etching liquid which effects etching on the first and third metal layers 121 and 123 but does not effect etching on the second metal layer 122. Etching is effected only on the first and third metal layers 121 and 123 to form curved surfaces 161A, 161B, 163A, and 163B. For example, in the case in which Cr is deposited on the first and third metal layers 121, 123 and in which Cu is deposited on the second metal layer, it is possible to effect etching solely on the Cr by using a potassium ferricyanide solution as the etching liquid.

FIG. 16(*b*) is a diagram illustrating a recess forming process. An electroformed product is immersed in an etching liquid which effects etching on the second metal layer 122 but does not effect etching on the first and third metal layers 121, 123. Etching is effected solely on the second metal layer 122 to form the recess 150 of the depth W1.

In the case in which the escape wheel & pinion 100 has the curved surfaces 161B, 163B, it is possible to mitigate the stress when a shaft is driven into the axial hole 102, thereby preventing breakage.

Figure 17:
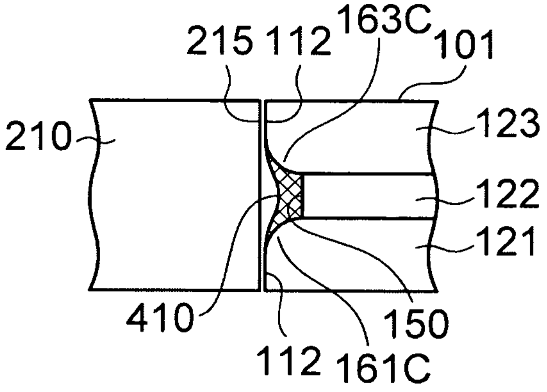
FIG. 17 A diagram showing a lubricating oil supply function of an escape wheel & pinion having a structure according to the present invention.

Further, also by adopting the configuration shown in FIG. 17, it is possible to achieve an improvement in terms of wear resistance. The escape wheel & pinion 100 has curved surfaces 161C, 163C at the crossing portions between the outer peripheral surfaces of the first and third metal layers 121, 123 and the surfaces in contact with the second metal layer 122. It is not necessary for the curvature R11*c* of the curved surface 161C and the curvature R13*c* of the curved surface 163C to be of the same value. The curved surfaces 161C, 163C are formed so as to extend from the recess 150 to the sliding surface, so that the lubricating oil 410 can be easily supplied from the recess 150 to the sliding portion as shown in FIG. 17. Thus, it is possible to achieve an improvement in lubrication property and in wear resistance.

A method of manufacturing the escape wheel & pinion 100 of the structure shown in FIG. 17 will be described below with reference to FIGS. 18 through 21.

Figure 18:
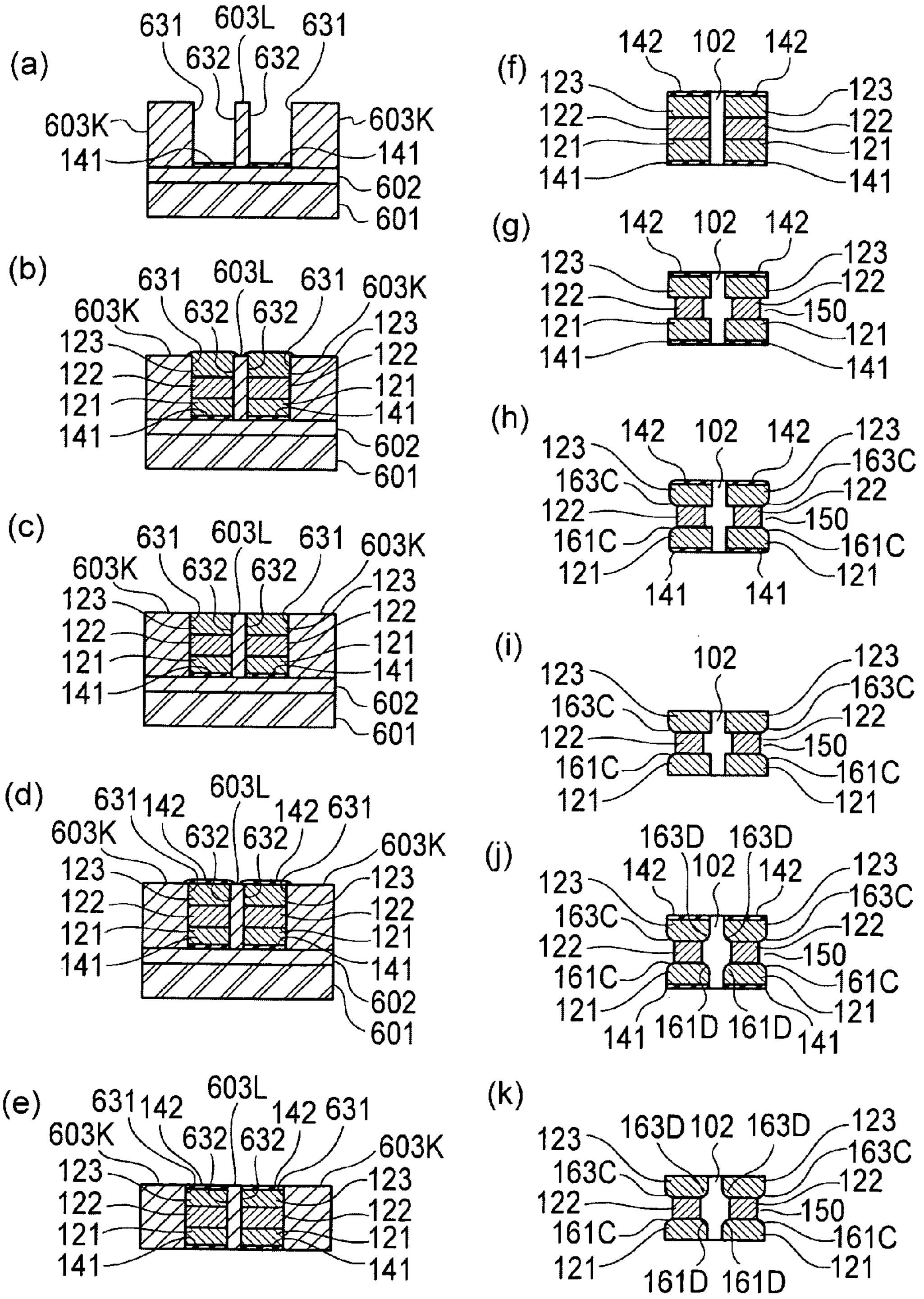
FIG. 18 A diagram showing a manufacturing process for an escape wheel & pinion having a structure according to the present invention.

FIG. 18(*a*) is a diagram illustrating a sacrifice layer electroforming process. After the step of FIG. 8(*c*), a first sacrifice layer 141 is deposited on the mold portion on the electrode material 602 other than the photo resists 603K, 603L. The electroformed product only grows from the bottom surface. The sacrifice layer 141 is formed of Au, Cr, Ni, Cu or the like. The thickness of the first sacrifice layer 141 is set to 10 nm to 10 μm.

FIG. 18(*b*) is a diagram illustrating a metal layer electroforming process. The first metal layer 121 is deposited on the first sacrifice layer 141 to a thickness T1. The second metal layer 122 is deposited thereon to a thickness T2. The third metal layer 123 is deposited thereon to a thickness of not less than T3 so that the thickness of the electroformed product may exceed the thickness T0 of the escape wheel & pinion 100.

FIG. 18(*c*) is a diagram illustrating a grinding/polishing process. Through grinding, the third metal layer 123 and the photo resists 603K, 603L are cut so that the escape wheel & pinion 100 may attain the thickness T0 to thereby effecting flattening. Further, polishing is performed to finish the surface of the third metal layer 123 as a mirror surface.

FIG. 18(*d*) is a diagram illustrating a sacrifice layer electroforming process. The second metal layer 142 is deposited on the third metal layer 123. The second sacrifice layer 142 is formed of Au, Cr, Ni, Cu or the like. The thickness of the second sacrifice layer 142 is set to 10 nm to 10 μm.

FIG. 18(*e*) is a diagram illustrating a substrate/electrode removal process. The substrate 601 and the electrode 602 are removed by etching or the like.

FIG. 18(*f*) is a diagram illustrating a resist removal process. The photo resists 603K, 603L are removed by etching, physical force or the like.

FIG. 18(*g*) is a diagram illustrating a recess forming process. An electroformed product is immersed in an etching liquid which effects etching on the second metal layer 122 but does not effect etching on the first and third metal layers 121, 123 and the first and second sacrifice layers 141, 142. Etching is effected only on the second metal layer 122 to form the recess 150 of the depth W1. For example, in the case in which Ni is deposited on the first and third metal layers 121, 123, in which Cu is deposited on the second metal layer 122, and in which Cr is deposited on the first and second sacrifice layers 141, 142, it is possible to effect etching solely on the Cu by using an ammonium persulfate solution as the etching liquid.

FIGS. 18(*h*) and 18(*j*) are diagrams illustrating a barrel polishing process. The electroformed product is polished with a barrel to form the curved surfaces 161C, 163C. The radius of the curved surfaces 161C, 163C can be adjusted according to the barrel polishing condition. As shown in FIG. 17, in the case of a configuration which has no curved surfaces at the crossing portions between the outer peripheral surfaces of the first and third metal layers 121, 123 and the surfaces not in contact with the second metal layer 122, the radius of the curved surfaces 161C, 163C is set to be not more than the thickness of the first and second sacrifice layers 141, 142. As shown in FIG. 18(*j*), depending upon the barrel polishing condition, the crossing portions between the inner peripheral surfaces of the first and third metal layers 121, 123 and the surfaces not in contact with the second metal layer 122 are polished to thereby form curved surfaces 161D, 163D. It is not necessary for the curvatures R11*c*, R13*c*, the curvature R11*d* of the curved surface 161D, and the curvature R13*d* of the curved surface 163D to be of the same value.

FIGS. 18(*i*) and 18(*k*) are diagrams illustrating a sacrifice layer removal process. An electroformed product is immersed in an etching liquid which effects etching on the first and second sacrifice layers 141, 142 but does not effect etching on the first and third metal layers 121, 123, and the second metal layer 122. Etching is effected only on the first and second sacrifice layers 141, 142 to remove the sacrifice layers. For example, in the case in which Ni is deposited on the first and third metal layers 121, 123, in which Cu is deposited on the second metal layer 122, and in which Cr is deposited on the first and second sacrifice layers 141, 142, it is possible to effect etching solely on the Cr by using a potassium ferricyanide solution as the etching liquid.

Figure 19:
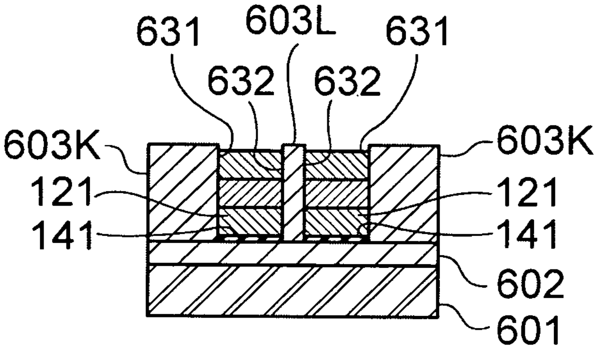
FIG. 19 A diagram showing a manufacturing process for an escape wheel & pinion having a structure according to the present invention.
Figure 19:
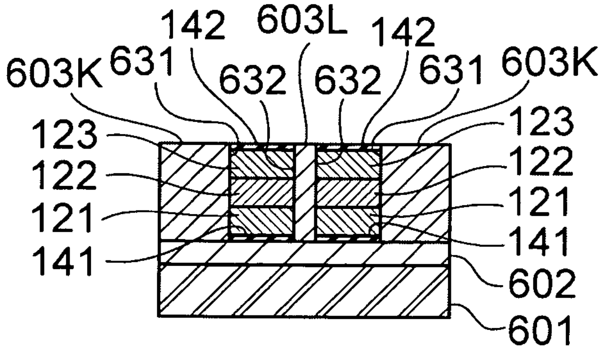

The process shown in FIGS. 18(*b*) through 18(*d*) can also be performed by the process illustrated in FIGS. 19(*a*) and 19(*b*).

FIG. 19(*a*) is a diagram illustrating a metal layer electroforming process. The first metal layer 121 is deposited on the first sacrifice layer 141 to a thickness T1. The second metal layer 122 is deposited thereon to a thickness T2. The third metal layer 123 is deposited thereon to a thickness T3. The sum total of the thickness of the first sacrifice layer and the thickness T1, the thickness T2, and the thickness T3 is smaller than the thickness of the photo resists 603K, 603L.

FIG. 19(*b*) is a diagram illustrating a sacrifice layer electroforming process. The second metal layer 142 is deposited on the third metal layer 123.

Figure 20:
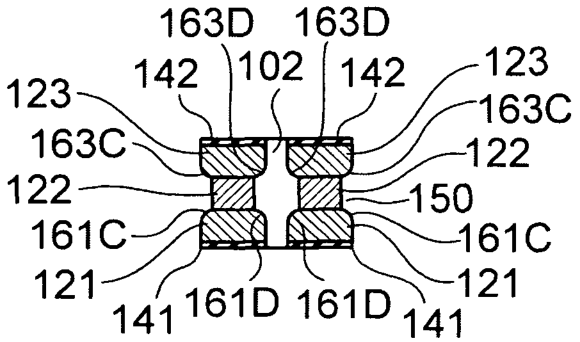
FIG. 20 A diagram showing a manufacturing process for an escape wheel & pinion having a structure according to the present invention.
Figure 20:
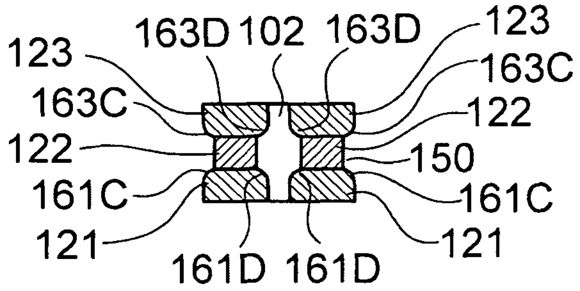

The process shown in FIGS. 18(*g*) through 18(*j*) can also be performed by the process illustrated in FIGS. 20(*a*) and 20(*b*).

FIG. 20(*a*) is a diagram illustrating a wet etching process. An electroformed product is immersed in an etching liquid which effects etching on the first and third metal layers 121 and 123 but does not effect etching on the second metal layer 122 and the first and second sacrifice layers 141, 142. Etching is effected only on the first and third metal layers 121 and 123 to thereby form the curved surfaces 161C, 161D, 163C, and 163D. For example, in the case in which Ni is deposited on the first and third metal layers 121, 123, in which Cr is deposited on the second metal layer, and in which Cu is deposited on the first and second sacrifice layers 141, 142, it is possible to effect etching solely on the Ni by using a nickel selective etching liquid —NC (manufactured by Nippon Chemical Industry Kabushiki Kaisha) as the etching liquid. FIG. 20(*b*) is a diagram illustrating a sacrifice layer removal process. An electroformed product is immersed in an etching liquid which effects etching on the first and second sacrifice layers 141, 142 but does not effect etching on the first and third metal layers 121, 123 and the second metal layer 122. Etching is effected only on the first and second sacrifice layers 141, 142 to remove the sacrifice layers.

Figure 21:
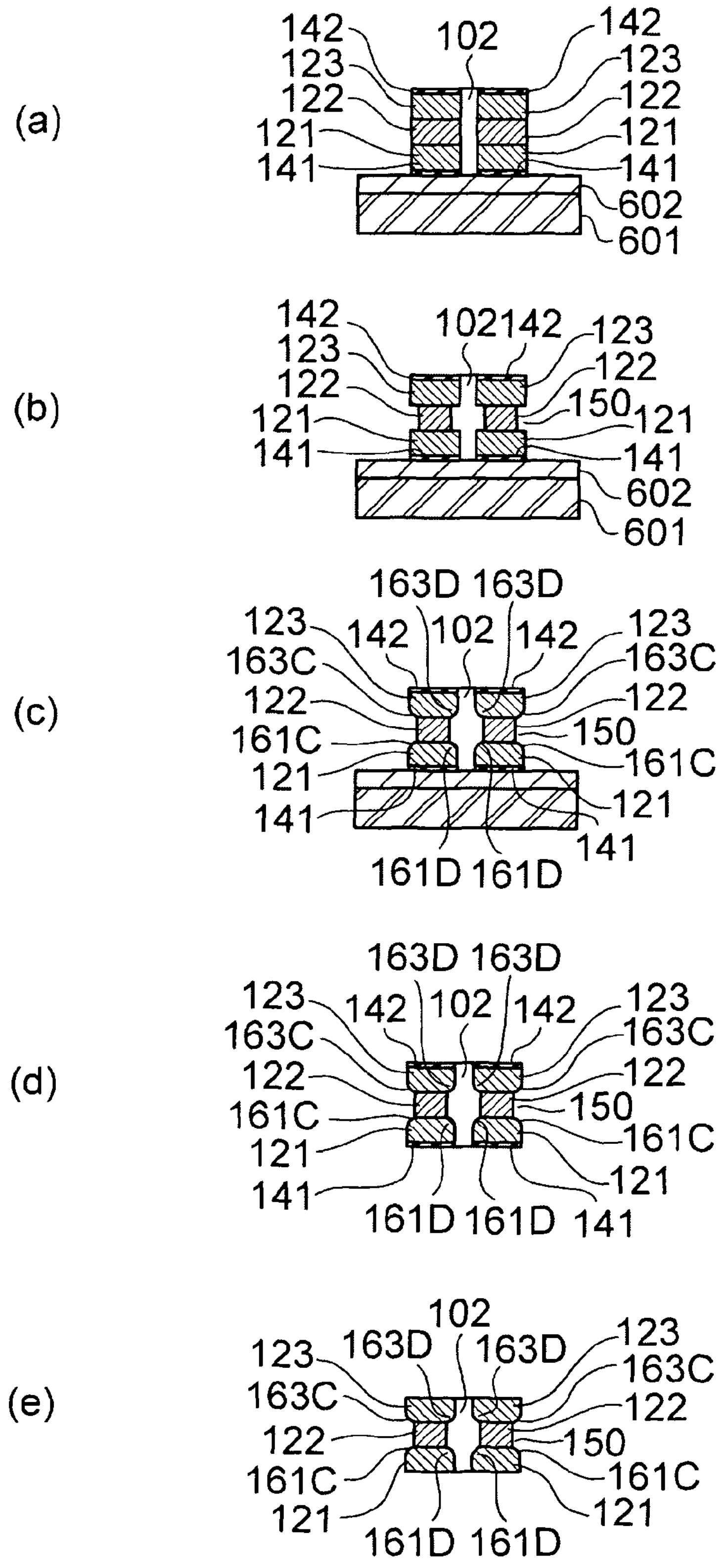
FIG. 21 A diagram showing a manufacturing process for an escape wheel & pinion having a structure according to the present invention.

The process shown in FIGS. 18(*d*) through 18(*j*) can also be performed by the process shown in FIGS. 21(*a*) through 21(*e*).

FIG. 21(*a*) is a diagram illustrating a resist removal process. The photo resists 603K, 603L are removed by etching, physical force or the like.

FIG. 21(*b*) is a diagram illustrating a recess forming process. An electroformed product is immersed in an etching liquid which effects on the second metal layer 122 but does not effect etching on the first and third metal layers 121, 123 and the first and second sacrifice layers 141, 142. Etching is effected only on the second metal layer 122 to form the recess 150 of the depth W1.

FIG. 21(*c*) is a diagram illustrating a wet etching process. An electroformed product is immersed in an etching liquid which effects etching on the first and third metal layers 121 and 123 but does not effect etching on the second metal layer 122 and the first and second sacrifice layers 141, 142. Etching is effected only on the first and third metal layers 121 and 123 to thereby form the curved surfaces 161C, 161D, 163C, and 163D.

FIG. 21(*d*) is a diagram illustrating an electroformed product separating process. The substrate 601 and the electrode 602 are removed by etching, physical force or the like.

FIG. 21(*e*) is a diagram illustrating a sacrifice layer removal process. An electroformed product is immersed in an etching liquid which effects on the first and second sacrifice layers 141, 142 but does not effect etching on the first and third metal layers 121, 123 and the second metal layer 122. Etching is effected only on the first and second sacrifice layers 141, 142 to remove the sacrifice layers.

Figure 22:
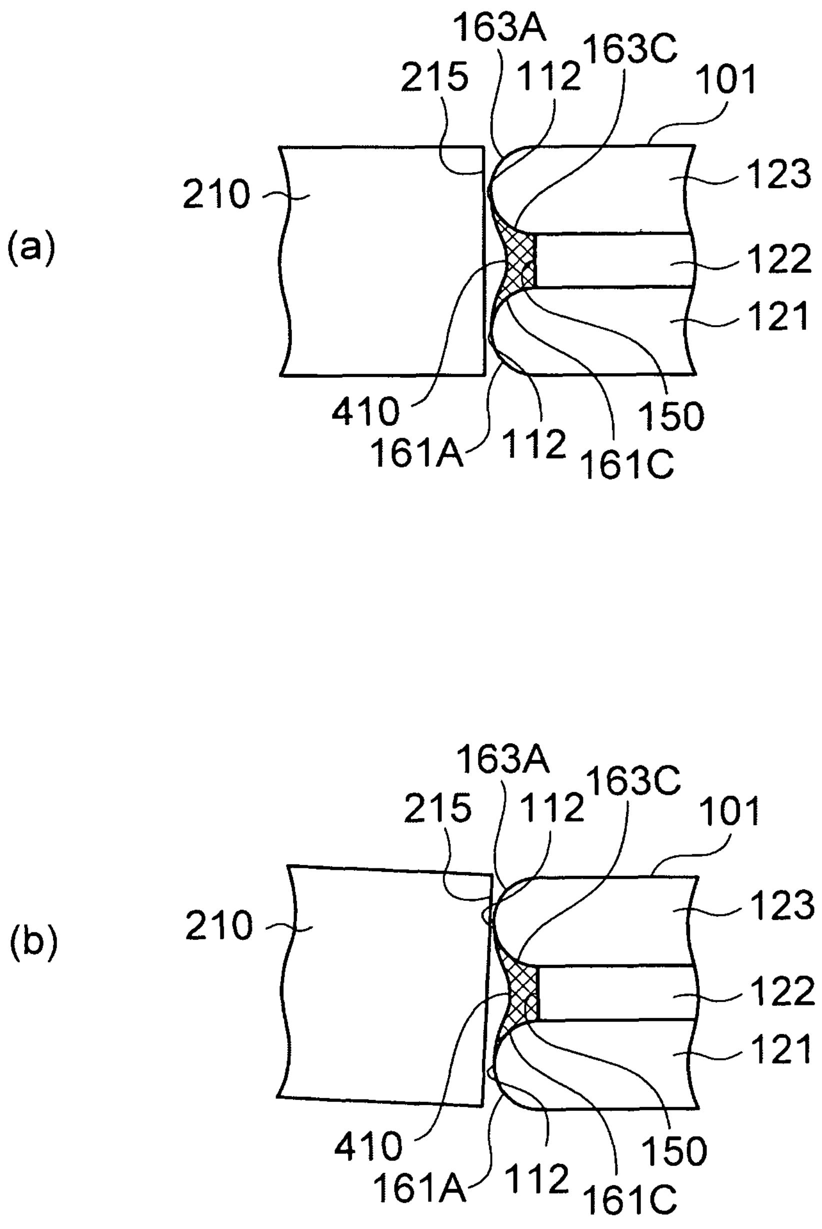
FIG. 22 A diagram showing a lubricating oil supply function of an escape wheel & pinion having a structure according to the present invention.

By using the configuration as shown in FIG. 22, it is possible to achieve a further improvement in terms of wear resistance. The escape wheel & pinion 100 shown in FIG. 22 has the curved surfaces 161A, 161C, 163A, and 163C. It is not necessary for the curvatures R11*a*, R11*c*, R13*a*, and R13*c* to be of the same value. Due to the provision of the configuration shown in FIG. 14, through the formation of the curved surfaces 161A, 163A as shown in FIG. 22(*b*), no corner abuts even when the escape tooth 101 and the pallet 210 are held in contact with each other while inclined, and a satisfactory lubrication property is provided, so that the frictional force is reduced, and an improvement in terms of wear resistance is achieved. Further, through the formation of the curved surfaces 161A, 161C, 163A, and 163C, the Hertz contact pressure at the time of sliding is reduced, so that an improvement in terms of wear resistance is achieved.

Further, due to the provision of the configuration shown in FIG. 17, the curved surfaces 161C, 163C are formed so as to extend from the recess 150 to the sliding surface, so that the lubricating oil 410 is easily supplied from the recess 150 to the sliding portion. Thus, an improvement is achieved in terms of lubrication property and wear resistance.

Further, in the case in which the curved surfaces 161A and 161C, and 163A and 163C, are connected with each other and in which the entire outer peripheral surface of the escape wheel & pinion 100 is a curved surface, it slides on the pallet 210 while in point contact therewith, so that an improvement is achieved in terms of lubrication property and wear resistance.

A method of manufacturing the escape wheel & pinion 100 of the structure shown in FIG. 22 will be described below with reference to FIG. 23.

Figure 23:
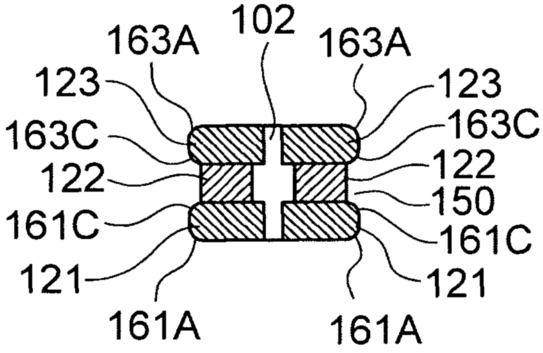
FIG. 23 A diagram showing a manufacturing process for an escape wheel & pinion having a structure according to the present invention.
Figure 23:
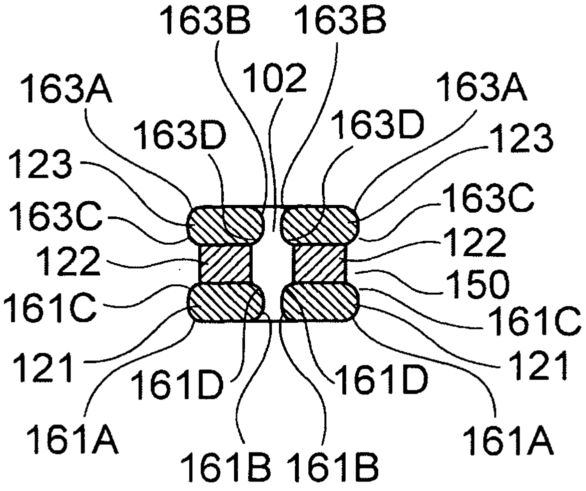

FIGS. 23(*a*) and 23(*b*) are diagrams illustrating a barrel polishing process. After the process of FIG. 10(*c*), the electroformed product is polished with a barrel to form the curved surfaces 161A, 161C, 163A, and 163C. The radius of the curved surfaces 161A, 161C, 163A, and 163C can be adjusted according to the barrel polishing condition. As shown in FIG. 23(*b*), the curved surfaces 161B, 161D, 163B, and 163D are formed depending upon the barrel polishing condition. It is not necessary for the curvatures R11*a*, R11*b*, R11*c*, R11*d*, R13*a*, R13*b*, R13*c*, and R13*d* to be of the same value.

The process shown in FIG. 23(*b*) can also be performed by the following process.

Figure 24:
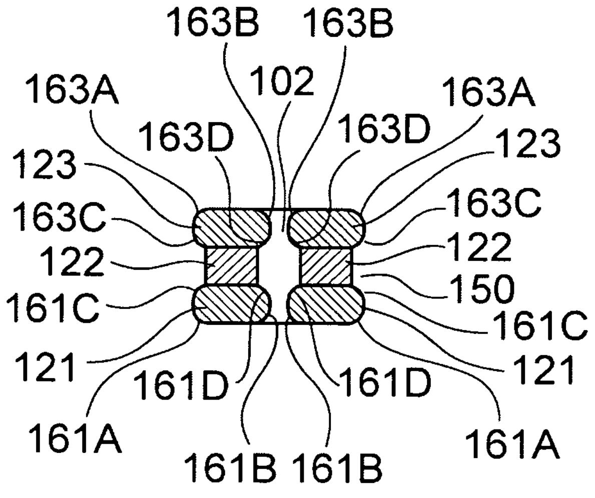
FIG. 24 A diagram showing a manufacturing process for an escape wheel & pinion having a structure according to the present invention.

FIG. 24(*a*) is a diagram illustrating a wet etching process. An electroformed product is immersed in an etching liquid which effects etching on the first and third metal layers 121 and 123 but does not effect etching on the second metal layer 122. Etching is effected only on the first and third metal layers 121 and 123 to thereby form the curved surfaces 161A, 161B, 161C, 161D, 163A, 163B, 163C, and 163D.

In the case in which the escape wheel & pinion 100 has the curved surfaces 161B, 161D, 163B, and 163D, it is possible to mitigate the stress when driving a shaft into the axial hole 102, thereby preventing breakage.

Second Embodiment

Figure 25:
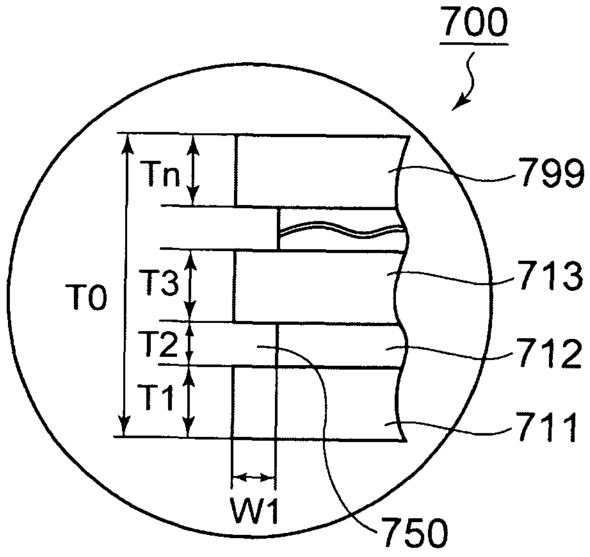
FIG. 25 A partial enlarged view of an escape wheel & pinion having a structure according to the present invention.

FIG. 25 is a partial enlarged view of an escape wheel & pinion 700 having a structure according to the present invention. The escape wheel & pinion 700 has a multi-layer structure in which n layers (n is an integer of 4 or more) are stacked together in the thickness direction; for example, it is composed of first, third, . . . metal layers 711, 713, . . . which are formed of the same material as the first and third metal layers 121, 123 of the first embodiment and of a larger outer dimension, and second, fourth, . . . metal layers 712, 714, . . . which are, for example, formed of the same material as the second metal layer 122 and of a smaller outer dimension.

In the second embodiment described above, the effect of the first embodiment is further enhanced. In the following, a case will be described in which n is an odd number and in which the uppermost layer and the lowermost layer are metal layers of a larger outer dimension. In this case, the uppermost layer and the lowermost layer are metal layers that do not undergo etching, so that even when etching is effected on the metal layers to reduce the outer dimension in order to form a recess, there is advantageously no variation in the thickness TO of the escape wheel & pinion 700.

Here, suppose n=2 m+1 (m is an integer of 2 or more). The sliding component 700 has (m+1) first, third, . . . metal layers of a larger outer dimension and m second, fourth, . . . metal layers of a smaller outer dimension, with these metal layers being alternately stacked together in the thickness direction.

In the escape wheel & pinion 700, the outer dimension of the second, fourth, . . . metal layers 712, 714, . . . is smaller than the outer dimension of the first, third, . . . metal layers 711, 713, . . . ). The outer peripheral surfaces of the second, fourth, . . . metal layers 712, 714, . . . are recessed from the outer peripheral surface of the escape wheel & pinion 700 (the outer peripheral surfaces of the first, third, . . . metal layers 711, 713, . . . ). Thus, in this embodiment, the escape wheel & pinion 700 has, dispersed in the thickness direction, m recesses 750 that are not open in the thickness direction of the escape wheel & pinion 100, at least in a part of the sliding portion, over the entire periphery of the outer peripheral surface of the escape wheel & pinion 700. The recesses 750 serve to retain the lubricating oil.

Figure 26:
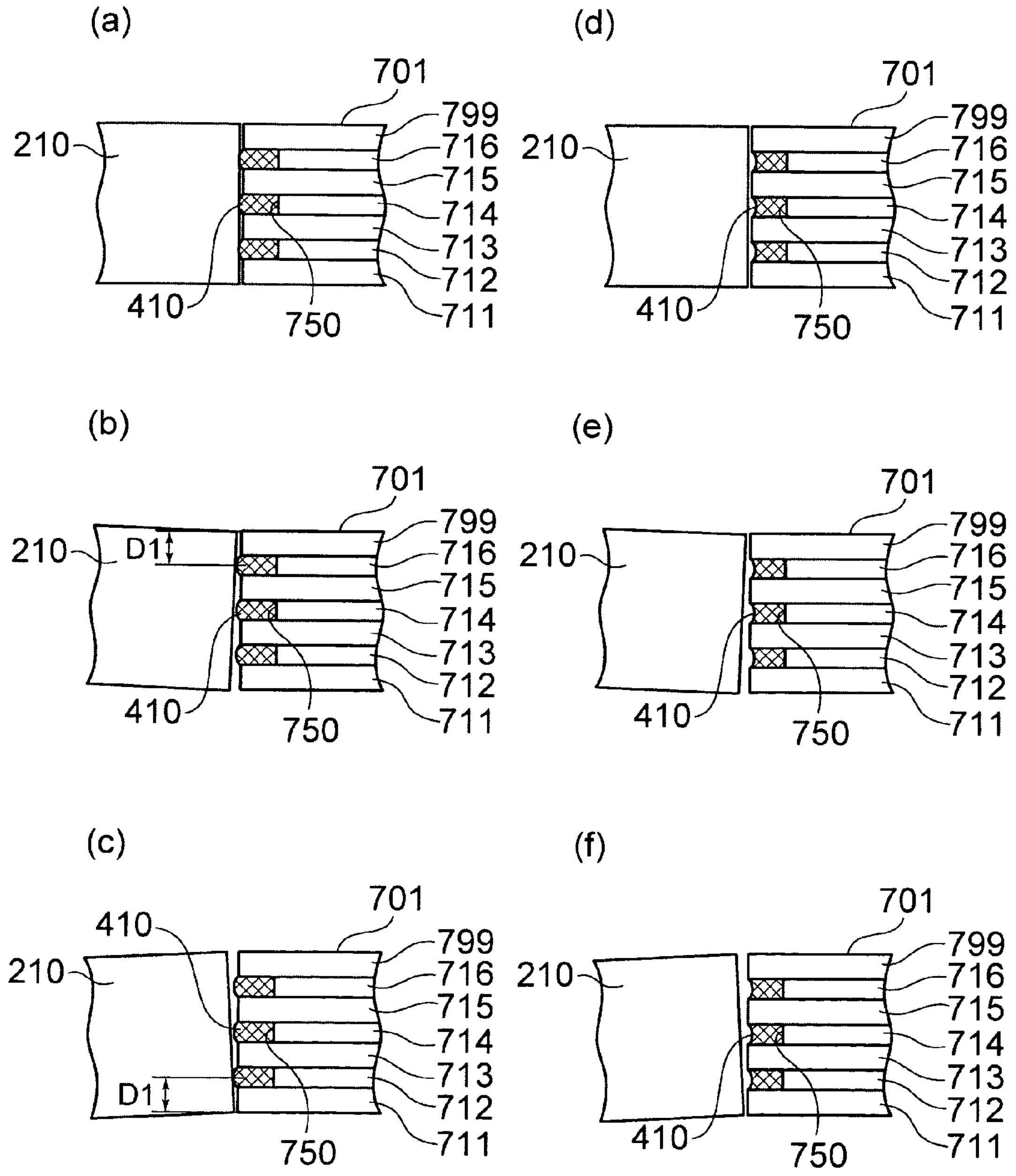
FIG. 26 A diagram showing a lubricating oil supply function of an escape wheel & pinion having a structure according to the present invention.

FIG. 26 is a sectional view showing the sliding process between an escape tooth 701 of the escape wheel & pinion 700 and a pallet 210 of the pallet fork 200 when m=3. As shown in FIGS. 26(*a*) and 26(*d*), when the escape tooth 701 and the pallet 210 are in contact with each other in a straight state, there are a plurality of places to which the lubricating oil 410 is supplied, so that there is supplied more lubricating oil 410 than in the first embodiment, with the lubricating oil being delivered uniformly.

As shown in FIGS. 26(*b*), 26(*e*), 26(*c*), and 26(*f*), in the case in which the escape tooth 701 and the pallet 210 are in contact with each other while inclined, when a plurality of recesses 750 are distributed over a wide range, the distance D1 from the contact point between the escape tooth 701 and the pallet 210 to the closest recess 750 is smaller than the distance D1 from the contact point between the escape tooth 101 and the pallet 210 to the recess 150 in the example shown in FIGS. 7(*b*), 7(*e*), 7(*c*), and 7(*f*), so that the lubricating oil 410 can be supplied reliably.

Figure 27:
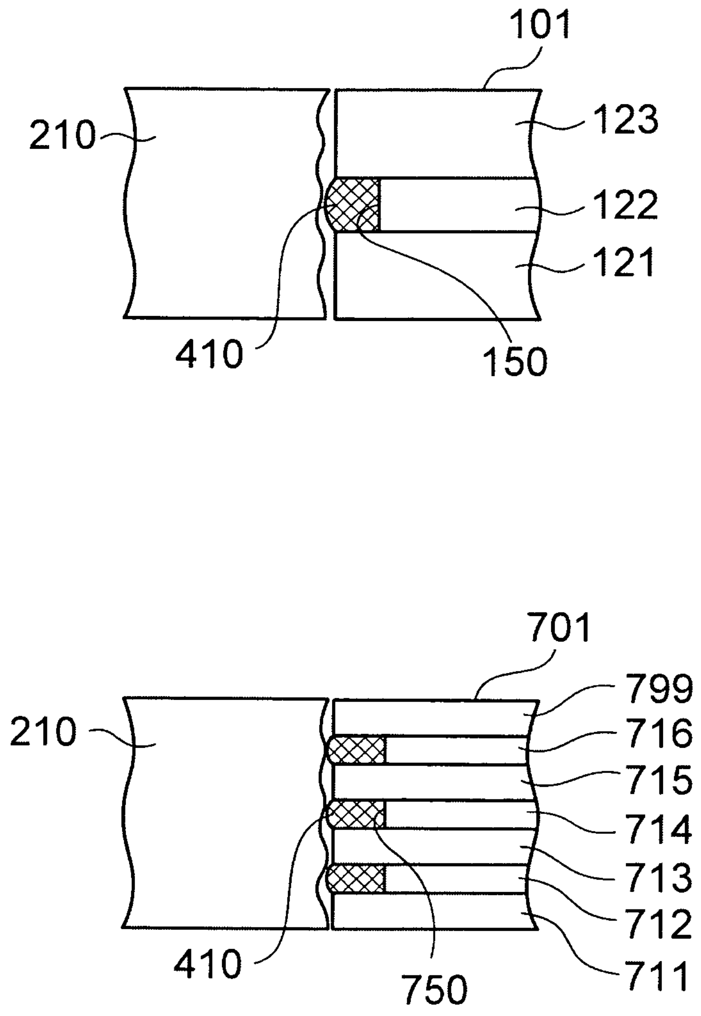
FIG. 27 A diagram showing a lubricating oil supply function of an escape wheel & pinion having a structure according to the present invention.

Further, when the pallet 210 has surface irregularities as shown in FIG. 27, when there is only one recess 150 as in the case of FIG. 27(*a*), there is a possibility of the lubricating oil 410 not being supplied properly. In contrast, when a plurality of recesses 750 are distributed in the thickness direction as shown in FIG. 27(*b*), the lubricating oil 410 can be supplied reliably.

Figure 28:
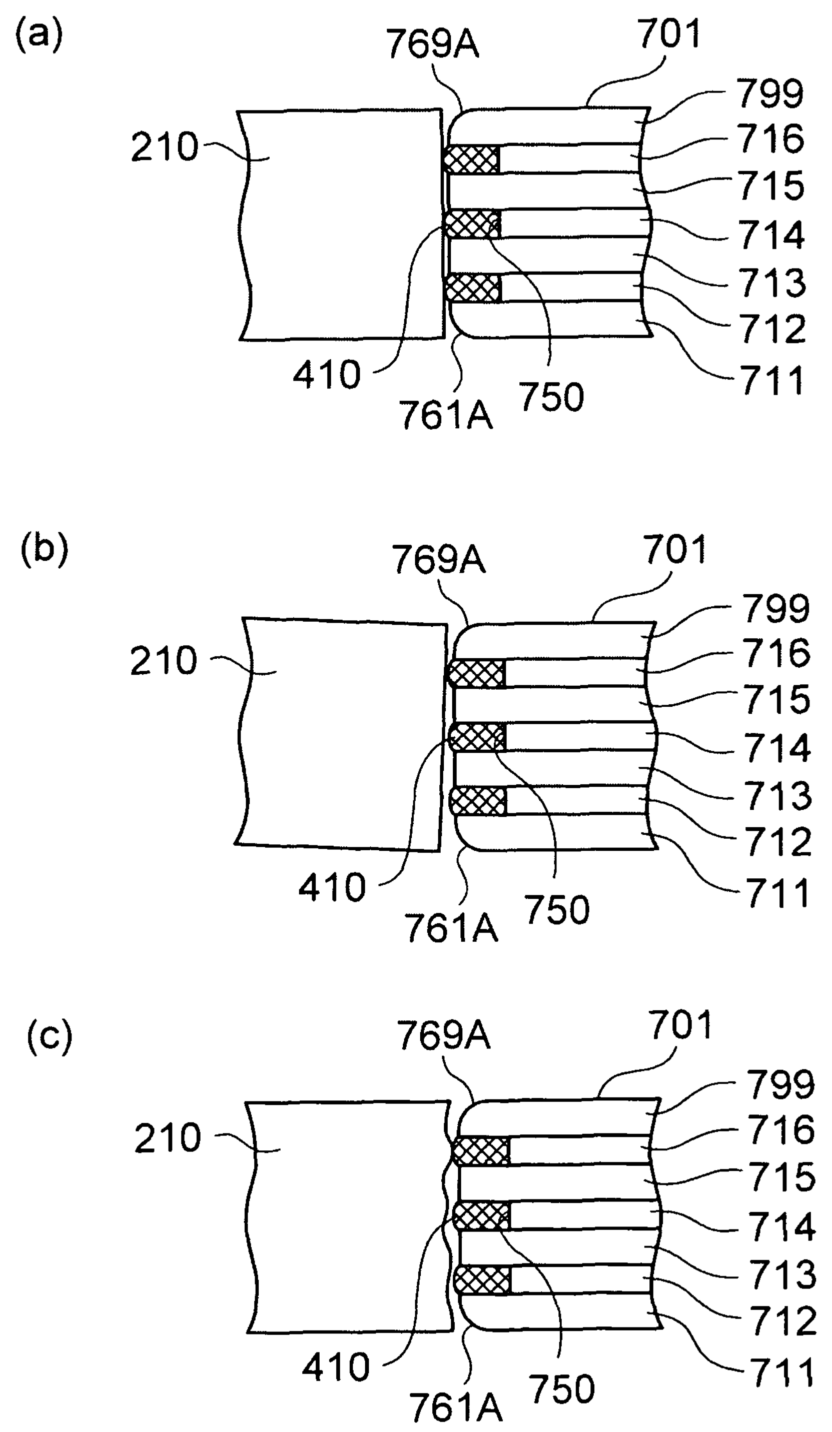
FIG. 28 A diagram showing a lubricating oil supply function of an escape wheel & pinion having a structure according to the present invention.

Further, as shown in FIG. 28, when there are provided curved surfaces 761A, 769A at the crossing portions between the outer peripheral surfaces of metal layers 711, 799 of the escape wheel & pinion 700 and the surfaces not in contact with layers 712, 716, the resultant wear resistance is superior to that in the case of FIGS. 26(*b*), 26(*e*), 26(*c*), and 26(*f*). It is not necessary for the curvature R71*a* of the curved surface 761A and the curvature R79*a* of the curved surface 769A to be of the same value. As shown in FIGS. 26(*b*), 26(*e*), 26(*c*), and 26(*f*), when the escape tooth 701 and the pallet 210 are in contact with each other while inclined, there is a possibility of a corner abutting to cause an increase in frictional force. In contrast, by using the configuration as shown in FIG. 28, due to the provision of the curved surfaces 761A, 769A as shown in FIG. 28(*b*), no corner abuts even when the escape tooth 701 and the pallet 210 are held in contact with each other while inclined, and satisfactory lubrication property is provided, so that an improvement in terms of wear resistance is achieved.

Figure 29:
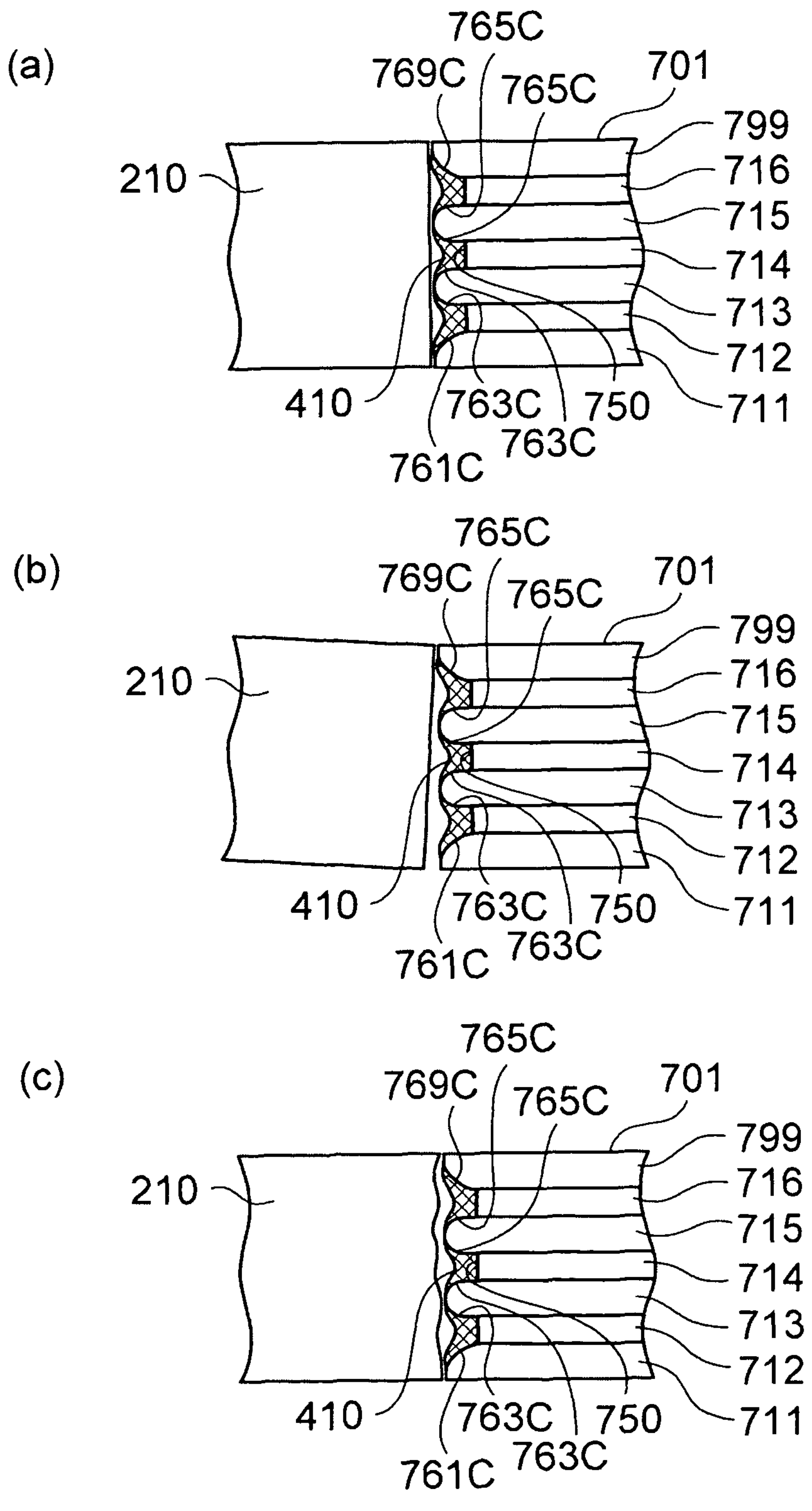
FIG. 29 A diagram showing a lubricating oil supply function of an escape wheel & pinion having a structure according to the present invention.

As shown in FIG. 29, in a case in which there are provided curved surfaces 761C, 769C at the crossing portions between the outer peripheral surfaces of the metal layers 711, 799 of the escape wheel & pinion 700 and the surface in contact with the layers 712, 716 and in which there are provided curved surfaces 763C, 765C at the crossing portions between the outer peripheral surfaces of the metal layers 713, 715 and the surface in contact with the upper and lower metal layers, the wear resistance is superior to that in the case of FIGS. 26 and 27(*b*). It is not necessary for the curvature R71*c* of the curved surface 761C, the curvature R73*c* of the curved surface 763C, the curvature R75*c* of the curved surface 765C, and the curvature R79*c* of the curved surface 769C to be of the same value. Since the portion extending from the recess 750 to the sliding surface is a curved surface, the lubricating oil 410 can be easily supplied from the recess 750 to the sliding portion as shown in FIG. 29, and the lubrication property is improved, whereby an improvement in terms of wear resistance is achieved.

Figure 30:
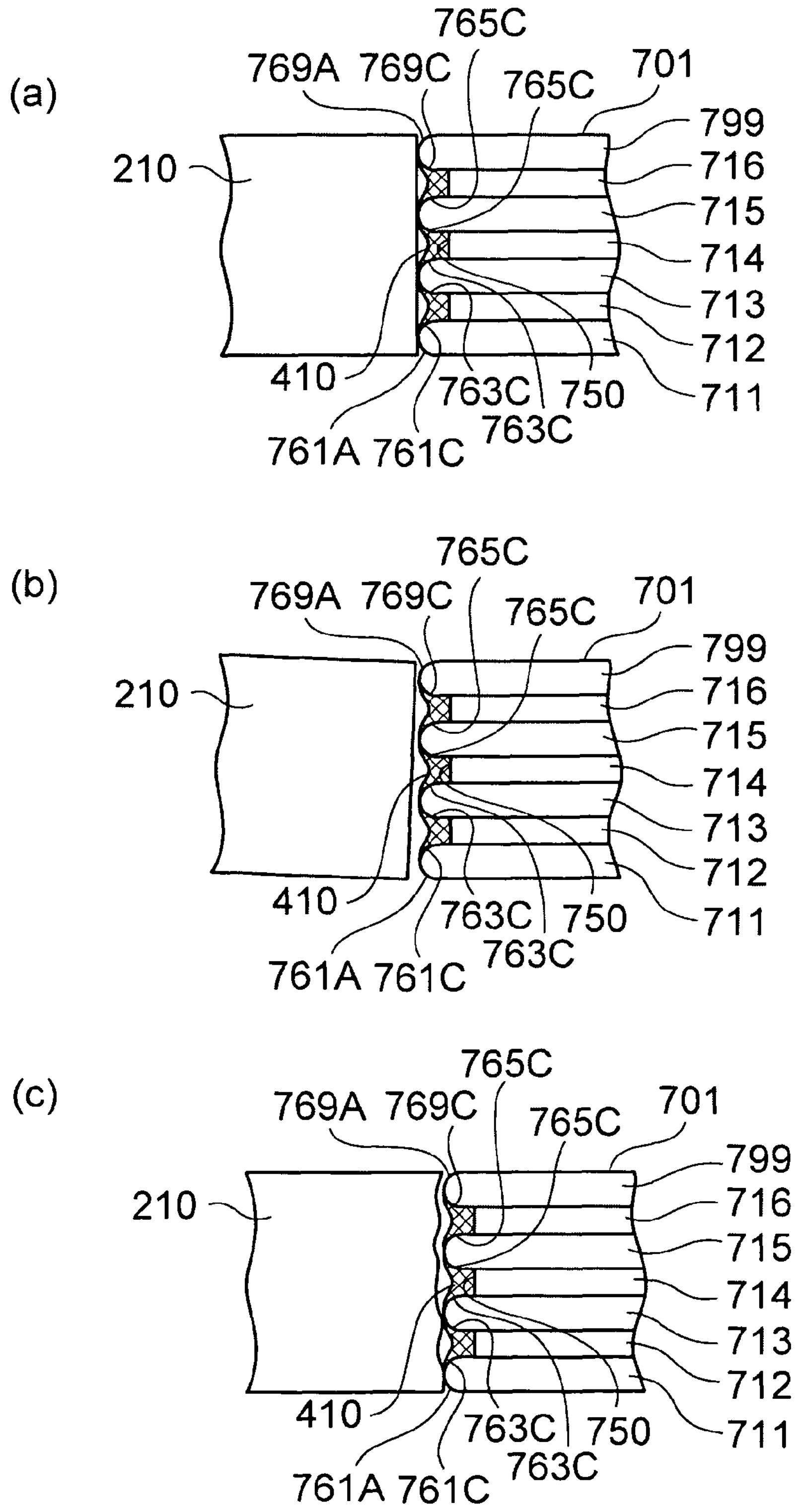
FIG. 30 A diagram showing a lubricating oil supply function of an escape wheel & pinion having a structure according to the present invention.
Figure 31:
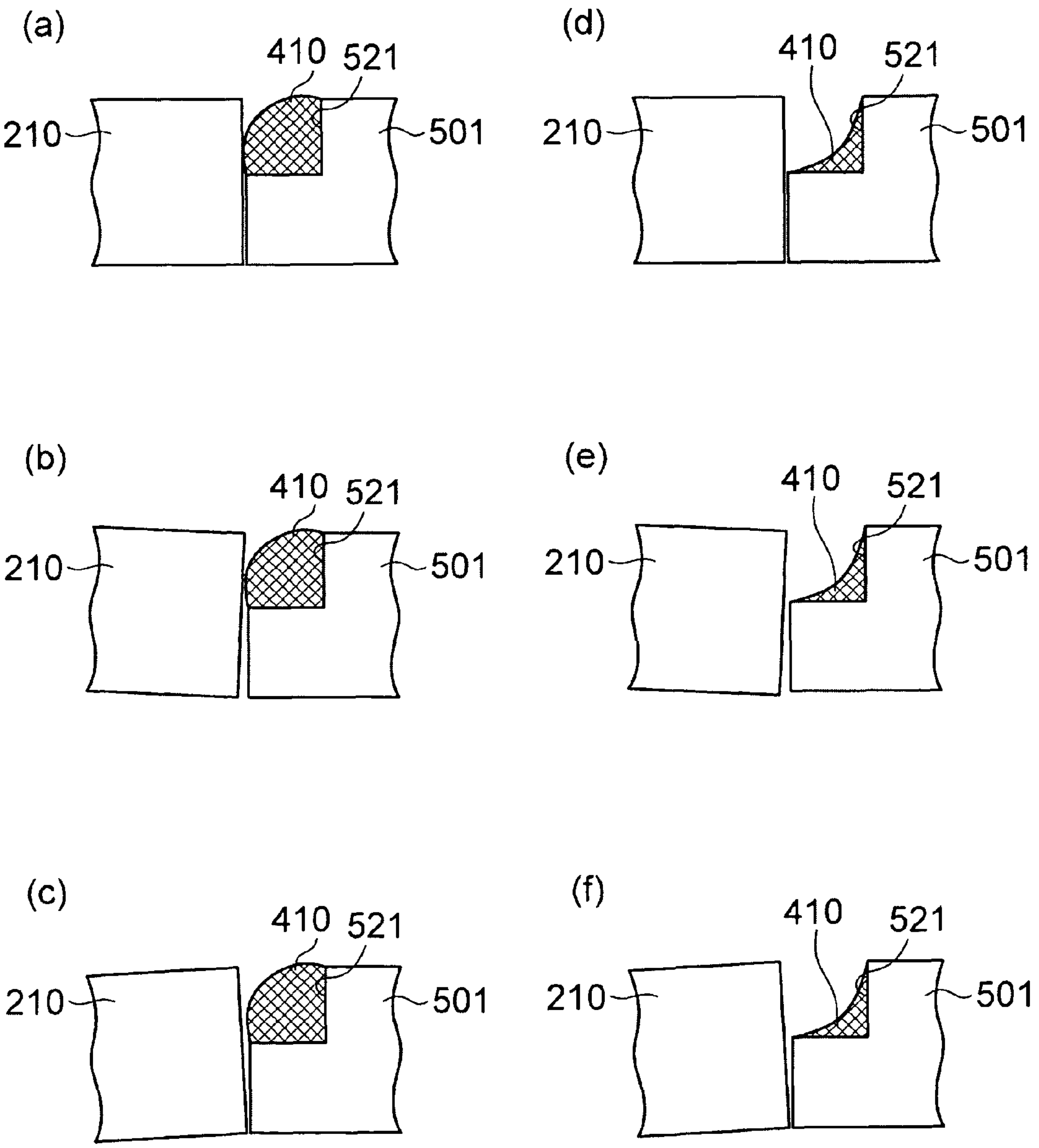
FIG. 31 A diagram showing a lubricating oil supply function of a conventional escape wheel & pinion.

Further, when, as shown in FIG. 30, there are provided curved surfaces 761A, 761C, 763C, 765C, 769C, 769A, and 769C, the wear resistance is further enhanced. It is not necessary for the curvatures R71*a*, R71*c*, R73*c*, R75*c*, R79*a*, and R79*c* to be of the same value. As shown in FIG. 30(*b*), even when the escape tooth 701 and the pallet 210 are held in contact with each other while inclined, no corner abuts, and satisfactory lubrication property is provided, so that the frictional force is reduced, and the wear resistance is enhanced. Further, since there is no corner, the Hertz contact pressure at the time of sliding is reduced, thereby achieving an improvement in terms of wear resistance. Further, the portion from the recess 750 to the sliding surface is a curved surface, the lubricating oil 410 can be easily supplied from the recess 750 to the sliding portion as shown in FIG. 30, and an improvement is achieved in terms of lubrication property and wear resistance. Further, in the case in which the entire outer peripheral surface of the escape wheel & pinion 700 is a curved surface, it slides on the pallet 210 while in point contact therewith, so that an improvement is achieved in terms of lubrication property and wear resistance.

Further, since the escape wheel & pinion 700 has a plurality of recesses 750 for retaining the lubricating oil, so that the amount of lubricating oil 410 retained is large. Thus, the inter-maintenance period of can be made longer than that in the first embodiment.

The thickness T0 of the escape wheel & pinion 700 is the same as the thickness T0 in the first embodiment. The thicknesses T1 through T2*m*+1 of the metal layers are the same as the thicknesses T1, T3 in the first embodiment. It is not necessary for the thicknesses T1 through T2*m*+1 to be of the same value. The thicknesses T2 through T2*m* are the same as the thickness T2 in the first embodiment. It is not necessary for the thicknesses T2 through T2*m* to be of the same value. The depth W1 of the recess W1 is the same as the depth W1 in the first embodiment.

The method of manufacturing the escape wheel & pinion 700 is the same as that in the first embodiment. However, the electroforming process shown in FIGS. 8(*d*) through 9(*f*), FIG. 12, FIG. 18(*b*), and FIG. 19(*a*) is conducted until the n-th layer is stacked. In this connection, the thickness as measured up to the (n−1)th layer is smaller than the thickness T0.

While in the above embodiments described above an escape wheel & pinion is taken as an example of the sliding component, this should not be construed restrictively; the present invention is also applicable to timepiece components such as a center, third, and second wheel & pinion, a ratchet wheel, a movement barrel, a click, and a crown wheel of a mechanical timepiece.

Further, the present invention is applicable not only to timepiece components but also to sliding components such as a cogwheel of an endoscope advancing/retreating apparatus, and a gear of a drive apparatus of a toy vehicle.

According to the present invention, it is possible to provide a sliding component having a lubricating oil retaining structure and that is superior in wear resistance, and a timepiece whose inter-maintenance period is prolonged by using this sliding component as a timepiece component. Further, according to the manufacturing method of the present invention, it is possible to easily manufacture a sliding component having a lubricating oil retaining structure and that is superior in wear resistance.

The invention claimed is:

1. A sliding component comprising: a multi-layer structure having at least three layers stacked together in a stacking direction, a sliding portion configured to undergo sliding contact with another component and being disposed on an outer peripheral surface of the multi-layer structure that is substantially parallel to the stacking direction, and at least one recess for retaining a lubricating oil that is supplied to the sliding portion during sliding contact between the sliding portion and the another component; wherein the at least three layers comprise a first metal layer, a second metal layer stacked on the first metal layer, and a third metal layer stacked on the second metal layer, the first and third metal layers having outer peripheral surfaces forming the outer peripheral surface of the multi-layer structure that is configured to undergo sliding contact with the another component, and the second metal layer having an outer peripheral surface extending inwardly from the outer peripheral surfaces of the first and third metal layers to provide the at least one recess that is not formed in any one of the first, second and third metal layers but is formed by a space bounded by surfaces of the first and third metal layers and the inwardly extending outer peripheral surface of the second metal layer; and wherein the second metal layer is formed of a material different from that of the first and third metal layers, the material of the second metal layer having a higher heat conductivity than the material of the first and third metal layers.

2. A sliding component according to claim 1; wherein the at least one recess comprises a plurality of recesses provided in the stacking direction of the multi-layer structure.

3. A sliding component according to claim 1; wherein the at least one recess is formed over the entire outer peripheral surface of the multi-layer structure.

4. A sliding component according to claim 1; wherein at least one of the first and third metal layers has a curved surface at a crossing portion between a surface parallel to the stacking direction and a surface substantially perpendicular to the stacking direction.

5. A sliding component according to claim 4; wherein the curved surface is formed on a side of the at least one of the first and third metal layers that is not in contact with the second metal layer.

6. A sliding component according to claim 4; wherein the curved surface is formed on a side of the at least one of the first and third metal layers that is in contact with the second metal layer.

7. A sliding component according to claim 4; wherein the curved surface is formed on a first side of the at least one of the first and third metal layers that is in contact with the second metal layer and on a second side of the at least one of the first and third metal layers opposite to the first side and that is not in contact with the second metal layer.

8. A sliding component according to claim 1; wherein the sliding component is a component for a timepiece.

9. A sliding component according to claim 1; wherein the sliding component is configured as an escape wheel.

10. A sliding component according to claim 1; wherein the multi-layer structure comprises an electroformed multi-layer structure.

11. A sliding component according to claim 1; wherein the at least one recess is formed over an entire peripheral surface of the second metal layer.

12. A timepiece having a sliding component according to claim 1.

13. A sliding component comprising:

a multi-layer structure having an uppermost metal layer, a lowermost metal layer, a central metal layer disposed between the uppermost and lowermost metal layers, and a sliding portion including outer peripheral surfaces of the uppermost and lowermost metal layers and configured to undergo sliding contact with a surface of another component different from the sliding component; and a lubricating oil retaining/supplying structure for retaining a lubricating oil and supplying the lubricating oil to the sliding portion during sliding contact between the sliding portion and the surface of the another component irrespective of a contact angle between the sliding portion and the surface of the another component, the lubricating oil retaining/supplying structure comprising at least one recess that is not formed in any one of the uppermost, lowermost and central metal layers but is formed by a space bounded by surfaces of the uppermost and lowermost metal layers, other than the outer peripheral surfaces thereof, and an outer peripheral surface of the central metal layer that extends inwardly from the outer peripheral surfaces of the uppermost and lowermost metal layers;

wherein the central metal layer is formed of a material different from that of the uppermost and lowermost metal layers, the material of the central metal layer having a heat conductivity higher than that for the material of the uppermost and lowermost metal layers.

14. A sliding component according to claim 13; wherein the uppermost, lowermost and central metal layers are stacked together in a stacking direction.

15. A sliding component according to claim 14; wherein the sliding portion is disposed substantially parallel to the stacking direction.

16. A sliding component according to claim 13; wherein the at least one recess is formed over an entire outer peripheral surface of the multi-layer structure.

* * * * *